(12) United States Patent
Hosokawa et al.

(10) Patent No.: US 6,304,034 B1
(45) Date of Patent: Oct. 16, 2001

(54) CATHODE RAY TUBE AND IMAGE CORRECTING METHOD

(75) Inventors: Hiromu Hosokawa, Chiba; Masamichi Okada, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/524,286

(22) Filed: Mar. 13, 2000

(30) Foreign Application Priority Data

Mar. 17, 1999 (JP) .................................................. 11-072651

(51) Int. Cl.[7] .............................. H01J 29/51; H01J 31/00
(52) U.S. Cl. ............................... 315/9; 315/10; 313/2.1; 313/477 R
(58) Field of Search ................................. 315/9, 10, 11, 315/13.1, 15, 382; 313/2.1, 421, 422, 426, 427, 461, 477 R

(56) References Cited

U.S. PATENT DOCUMENTS

| 5,694,003 | * | 12/1997 | Takahashi et al. | ........................ | 315/9 |
| 6,133,675 | * | 10/2000 | Enomoto et al. | ................. | 313/477 R |

FOREIGN PATENT DOCUMENTS

| 0 226 423 | 6/1987 | (EP) . |
| 0 600 325 | 6/1994 | (EP) . |
| 0 725 421 | 8/1996 | (EP) . |
| 0 814 493 | 12/1997 | (EP) . |
| 39-25641 | 9/1964 | (JP) . |
| 42-4928 | 2/1967 | (JP) . |
| 50-17167 | 2/1985 | (JP) . |
| 61144183A | 7/1986 | (JP) . |
| 07312734 | 11/1995 | (JP) . |
| 08212946 | 8/1996 | (JP) . |
| 09326239 | 12/1997 | (JP) . |
| 10283947 | 10/1998 | (JP) . |
| 10283947A | 10/1998 | (JP) . |

* cited by examiner

*Primary Examiner*—Don Wong
*Assistant Examiner*—Wilson Lee
(74) *Attorney, Agent, or Firm*—Ronald P. Kananen; Rader, Fishman & Grauer

(57) ABSTRACT

With the cathode ray tube and image correcting method of the invention, inside the cathode ray tube, an index electrode for outputting an electric detection signal according to an incidence of electron beams is provided in an over-scan region of the electron beams on the side of the joint of neighboring left and right divided screens. Based on a detection signal outputted from the index electrode, image display control is performed so that the left and right divided screens are joined in an appropriate positional relationship. Also, based on the detection signal outputted from the index electrode, brilliance modulation control at the joint area of the left and right divided screens is performed and thus image display control is performed so that changes in brilliance at the joint area remains inconspicuous.

12 Claims, 15 Drawing Sheets

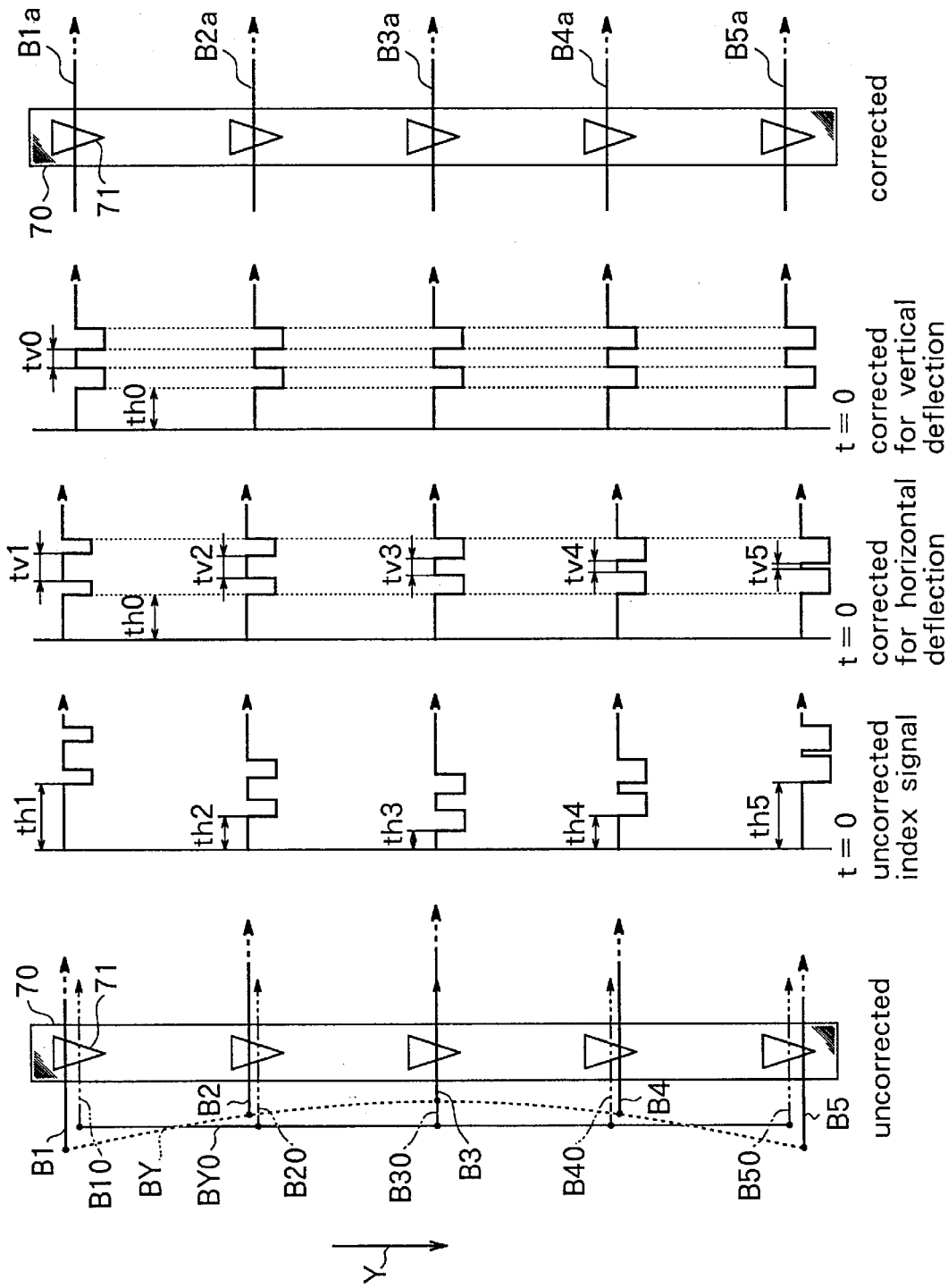

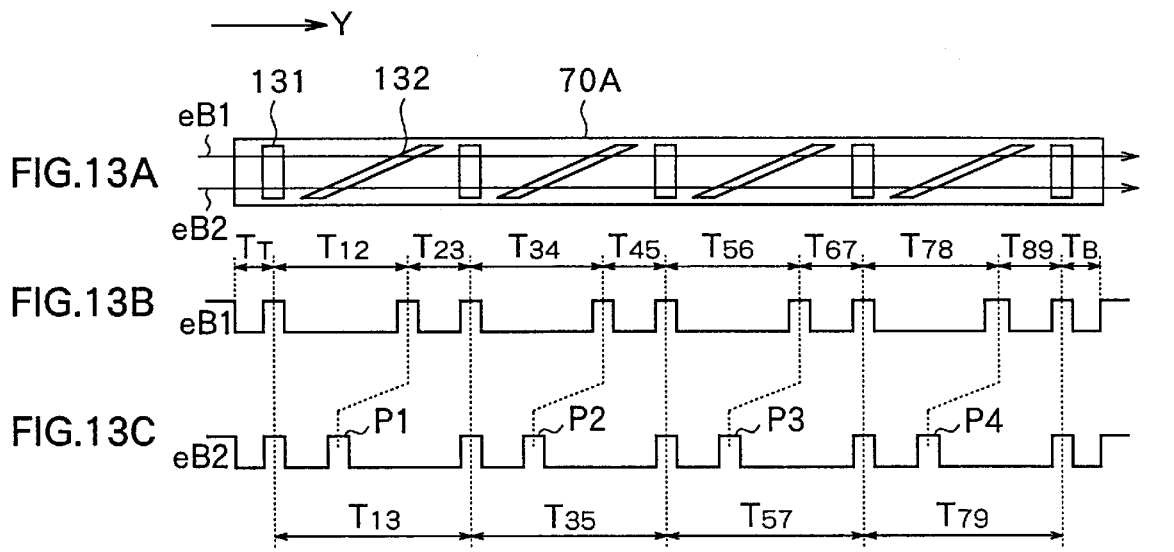
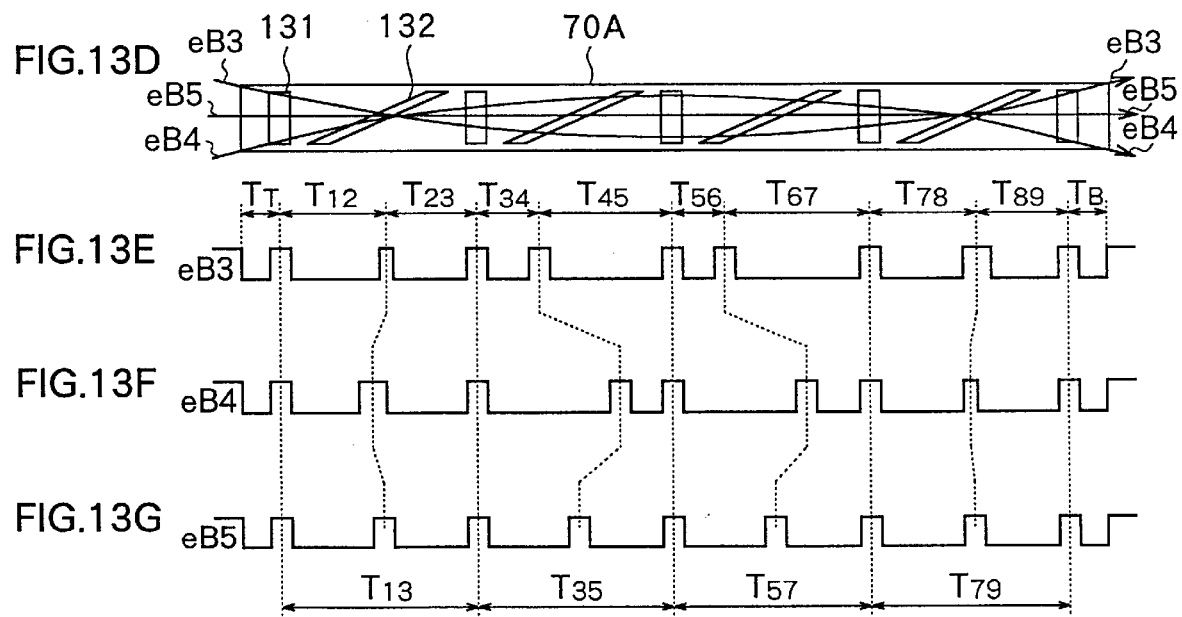

CATHODE RAY TUBE AND IMAGE CORRECTING METHOD

BACKGROUND OF THE INVENTION

1. Field of the Invention

The present invention relates to a cathode ray tube comprising a plurality of electron guns and an image correcting method in the cathode ray tube.

2. Description of the Related Art

In an image display apparatus such as a television receiver or a monitor apparatus for computers, cathode ray tubes (CRT) are widely used. A cathode ray tube forms a scan screen according to scanning of an electron beam by irradiating an electron beam toward a phosphor surface from an electron gun provided inside the cathode ray tube. A cathode ray tube comprising a single electron gun is common. However, in recent years, a cathode ray tube with multiple electron guns has been developed. In this type of cathode ray tube, a plurality of divided screens is formed by a plurality of electron beams-irradiated from a plurality of electron guns, and image display is performed through forming a single screen by joining the plurality of divided screens. The techniques regarding the cathode ray tube comprising the plurality of electron guns are disclosed in, for example, Japanese Patent Application laid-open No. Sho 39-25641, Japanese Patent Application laid-open No. Sho 42-4928 and Japanese Patent Application laid-open No. Sho 50-17167. The cathode ray tube comprising the plurality of electron guns has advantages such as that the depth can be shortened while the screen is enlarged.

In the above-mentioned cathode ray tube with multiple electron guns, it is preferable that the joint area of the divided screens are as inconspicuous as possible when joining the plurality of divided screens to display an image as a single screen. However, in the related art, the technique for making the joint area of the divided screens inconspicuous is insufficient so that a fine image cannot necessarily be obtained on a whole screen. For example, in a cathode ray tube, influence of geomagnetism or the like differs depending on the environment in which the tube is used. Therefore, image distortion or the like occurs and display in the above-mentioned joint area is adversely influenced. With the cathode ray tube with multiple electron guns of the related art, the display control of the joint area is environment dependent and therefore insufficient. Moreover, in a cathode ray tube, image display performance deteriorates through a processing circuit such as a deflection circuit being changed over time. In this respect, with the cathode ray tube with multiple electron guns of the related art, display control of the joint area is also dependent on the changes over time and thus is insufficient. As described, in the related art, the technique for appropriately joining the plurality of divided screens by the display control considering the environment, the changes over time or the like is insufficient. Therefore, it is difficult that the joint area on the screen are always inconspicuous so as not to disturb watching.

The invention has been designed to overcome the foregoing problems. The object is to provide a cathode ray tube and an image correcting method which can join a plurality of divided screens with the joint area being inconspicuous, and perform fine image display.

SUMMARY OF THE INVENTION

A cathode ray tube of the invention comprises: a plurality of electron guns for radiating a plurality of electron beams; means for detecting electron beams for outputting an optical or electrical signal according to an incidence of the electron beams, which is provided in a position corresponding to the overlap region of a plurality of divided screens in the tube; and control means for performing position control of the plurality of divided screens and modulation control of brilliance in the overlap region of the plurality of divided screens based on the optical or electrical signal outputted from the means for detecting electron beams so that the plurality of divided screens is appropriately joined and displayed.

An image correcting method of the invention outputs an optical or electrical signal from means for detecting electron beams provided in a position corresponding to the overlap region of a plurality of divided screens according to an incidence of electron beams in the cathode ray tube; and performs position control of the plurality of divided screens and modulation control of brilliance in the overlap region of the plurality of divided screens so that the plurality of divided screens is appropriately joined and displayed based on the optical or electrical signal outputted from the means for detecting electron beams.

With this cathode ray tube and image correcting method of the invention, in the tube, the optical or electrical signal is outputted from the means for detecting electron beams provided in the position corresponding to the overlap region of the plurality of divided screens according to the incidence of the electron beams; and position control of the plurality of divided screens and modulation control of brilliance in the overlap region of the plurality of divided screens are performed so that the plurality of divided screens is appropriately joined and displayed based on the optical or electrical signal outputted from the means for detecting electron beams. Consequently, excellent image display can be performed by joining the plurality of divided screens so that the joint area remains inconspicuous.

Other and further objects, features and advantages of the invention will appear more fully from the following description.

BRIEF DESCRIPTION OF THE DRAWINGS

FIGS. 5A to 5E are figures for describing the configuration of the index electrode and operation of position detection using the index electrode according to the first embodiment.

FIGS. 13A to 13G are figures for describing the configuration of an index electrode of the cathode ray tube according to the second embodiment and operation of position detection using the index electrode.

DETAILED DESCRIPTION OF THE PREFERRED EMBODIMENTS

Preferred embodiments of the invention will be described in detail with reference to the drawings.

First Embodiment

Figure 1:
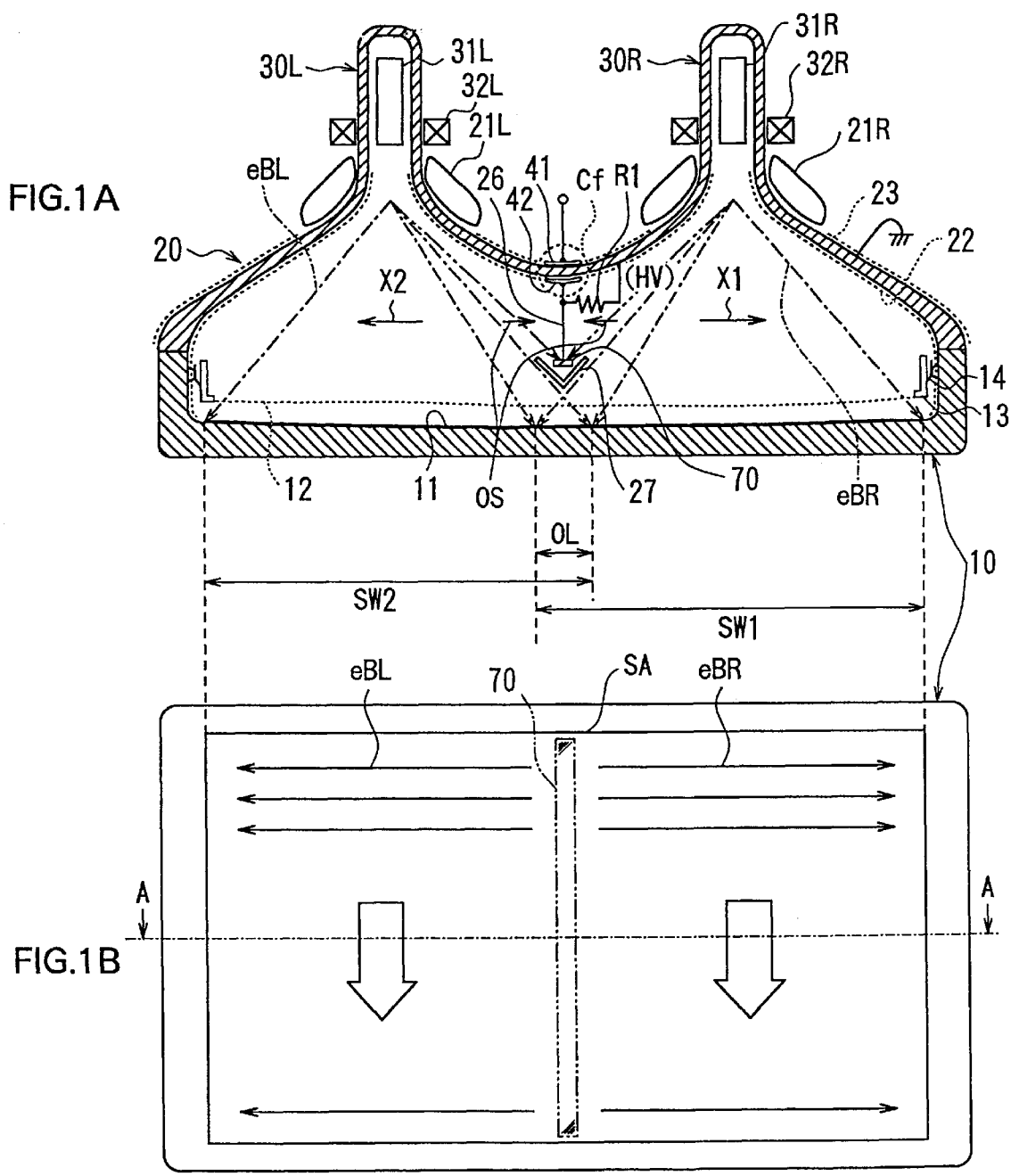
FIG. 1A is a cross section taken along the line A—A of FIG. 1B according to a first embodiment of a cathode ray tube.
FIG. 1B is a front view showing the scan direction of electron beams according to the first embodiment of the cathode ray tube.

As shown in FIGS. 1A and 1B, a cathode ray tube according to the embodiment comprises a panel 10 including a phosphor surface 11 inside, and a funnel 20 formed integrally with the panel 10. Two long-and narrow-shaped necks 30L and 30R each including built-in electron guns 31L and 31R are formed on the left and right side of the rear-end portion of the funnel 20, respectively. The cathode ray tube takes a double-funnel-shaped figure as a whole by the panel 10, the funnel 20, and the necks 30L and 30R. In the following, the outer portion forming the cathode ray tube is also called an outer vessel. Each opening of the panel 10 and the funnel 20 is fused to each other and the inside is capable of keeping high-vacuum condition. In the phosphor surface 11, a striped pattern (not shown) made of phosphor is formed. Inside the cathode ray tube, a color selection mechanism 12 made of a thin metal plate is positioned to face the phosphor surface 11. The color selection mechanism 12 is also called an aperture grill, a shadow mask or the like depending on the method being employed. The periphery of the color selection mechanism 12 is supported by a frame 13 and is installed on the inside surface of the panel 10 with a supporting spring 14 in between. An anode (not shown) for applying anode voltage HV is provided in the funnel 20. Deflection yokes 21L and 21R for deflecting each electron beam eBL and eBR irradiated from the electron guns 31L and 31R respectively, and convergence yokes 32L and 32R for performing convergence of each electron beam for each color irradiated from each electron gun 31L and 31R are installed in the peripheral portion extending from the funnel 20 to each neck 30L and 30R. The inside surface extending from the neck 30 to the phosphor surface 11 of the panel 10 is covered with an inside conductive film 22. The inside conductive film 22 is electrically connected to the anode (not shown) and is kept to anode voltage HV The peripheral surface of the funnel 20 is also covered with an outside conductive film 23.

The electron guns 31L and 31R each have a configuration (not shown) in which a plurality of electrodes (grids) is arranged in the front portion of a hot-cathode structure comprising three cathodes (hot cathodes) for Red (R), Green (G) and Blue (B). Each electrode performs control, acceleration and the like of the electron beams eBL and eBR irradiated from the cathodes. Each of the electron beams for each color irradiated from the electron guns 31L and 31R is irradiated onto the phosphor of the corresponding color of the phosphor surface 11 through the color selection mechanism 12.

In the cathode ray tube of the embodiment, the left half of the screen and an area extending into the right half of the screen are drawn by the electron beam eBL from the electron gun 31L provided on the left side, and the right half of the screen and an area extending into the left half of the screen are drawn by the electron beam eBR from the electron gun 31R provided on the right side. The edges of the left and right divided screens are joined with the edges overlapping each other. Thus, a single screen SA is formed. Accordingly, the center portion of the screen SA becomes an overlap region OL in which both right and left screens partially overlap each other. The phosphor surface 11 in the overlap region OL is for both of the electron beams eBL and eBR. In the embodiment, line scan of the electron beam eBL from the electron gun 31L is performed in a direction of horizontal deflection from right to left (X2 direction in FIG. 1A), and field scan is performed in a vertical deflection direction from the top to the bottom. Also, the line scan of the electron beam eBR from the electron gun 31R is performed in a direction of horizontal deflection from left to right (X1 direction in FIG. 1A), and the field scan is performed in a vertical deflection direction from the top to the bottom. In the embodiment, as a whole, the line scan of each electron beam eBL and eBR is performed from the center to the right or left side of the screen in a horizontal direction to the opposite direction from each other, and the field scan is performed from the top to the bottom like the common cathode ray tube.

In the cathode ray tube, an index electrode 70 with a rectangular shape is provided in a position facing the phosphor surface 11 in an over-scan region OS of the electron beams eBL and eBR on the joint side (center of the whole screen in the embodiment) of the left and right divided screens adjacent to each other. In addition, in the cathode ray tube, a V-shaped beam shield 27 as a shielding member of the electron beams eBL and eBR is provided between the index electrode 70 and the phosphor surface 11 so that the electron beams eBL and eBR which have over-scanned the over-scan region OS do not unnecessarily reach the phosphor surface 11 and emit light. The beam shield 27 is provided using, for example, the frame 13 supporting the color selection mechanism 12 as a base. The beam shield 27 becomes anode voltage HV by being electrically connected to the inside conductive film 22 through the frame 13.

In the index electrode 70, a plurality of notches 71 with an inverse-triangle shape is provided in a longitudinal direction as shown in FIG. 5A. The index electrode 70 outputs electric detection signals corresponding to an incidence of each electron beam eBL and eBR. The detection signals outputted from the index electrode 70 are inputted to a processing circuit for image correction outside the cathode ray tube and are used mainly for the control of the scan position in the joint area of each electron beam eBL and eBR. The detecting operation of the scan position of the electron beams eBL and eBR using the index electrode 70 will be described later by referring to FIGS. 5A to 5E. The index 70 corresponds to an specific example of the "means for detecting electron beams" of the invention.

In the embodiment, the over-scan region is the outer region of each scan region of the electron beams eBL and eBR forming the effective screen in each scan region of the electron beams eBb and eBR. In FIGS. 1A and 1B, a region SW1 is the effective screen on the phosphor surface 11 of the electron beam eBR in a horizontal direction, and a region SW2 is the effective screen on the phosphor surface 11 of the electron beam eBL in a horizontal direction.

The index electrode 70 is made of a conductive substance such as metal and is provided, for example, with an insulator in between (not shown) using the frame 13 as a base. The index electrode 70 is also electrically connected to a resistance R1 connected to the inside surface of the funnel 20, and the anode voltage HV is supplied through the inside conductive film 22 and a resistance R1. Also, the index electrode 70 is electrically connected to an electrode 42 through a lead line 26 on the inner side of the tube of a capacitor Cf which is formed using a part of the funnel 20. The capacitor Cf includes a region where the inside conductive film 22 and the outside conductive film 23 are partially (for example, in a circular shape) uncovered in the funnel 20. In the uncovered region, for example, the electrodes 41 and 42 are formed to place facing each other with the funnel 20 in between.

Figure 2:
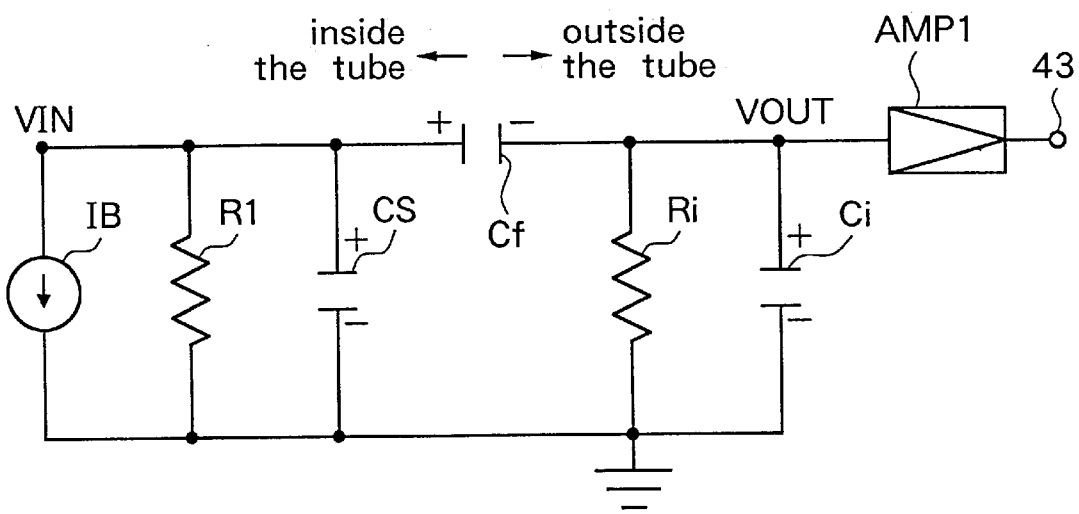
FIG. 2 is a block diagram showing an equivalent circuit including peripheral circuit elements of an index electrode used in the cathode ray tube according to the first embodiment.

In FIG. 2 the electrode 41 on the outer side of the tube of the capacitor Cf is connected to an amplifier AMP1 for amplifying signals. Input resistance Ri and input capacitance Ci of the amplifier AMP1 are connected between the electrode 41 of the capacitor Cf and the amplifier AMP1. One end of the input resistance Ri and the input capacitance Ci is grounded. Inside the tube, stray capacitance Cs is attached in between the index electrode 70, the beam shield 27 which is kept to the anode voltage HV, the inside conductive film 22 and so on. In the diagram, the electron beams eBL and eBR irradiated to the index electrode 70 are shown as a current source IB. In the equivalent circuit shown in FIG. 2, the current source IB, the resistance R1, the stray capacitance Cs, the input resistance Ri and the input capacitance Ci are connected in parallel in this order. The capacitor Cf is connected between the stray capacitance Cs and the input resistance Ri. The plus electrode of the capacitor Cf is connected to the plus side of the current source IB, the resistance R1 and the stray capacitance Cs. The minus electrode of the capacitor Cf is connected to the plus side of the input resistance Ri and the input capacitance Ci while being connected to the amplifier AMP1.

In the index electrode 70, when the over-scanned electron beams eBL and eBR are irradiated and collided, the potential drops down from the anode voltage HV (V) by Ib×R (V). In the embodiment, the voltage-drop signal is led out of the tube as a detection signal via the capacitor Cf. Ib represents a value of the current generated by the flow of the electron beams eBL and eBR. The cathode ray tube functions by scanning the electron beams eBL and eBR. In the embodiment, the signal generated by the electron beams being irradiated and collided to the index electrode 70, which is provided in a specific part inside the tube, is an intermittent signal. Therefore, the detection signal from the index electrode 70 does not have to be transmitted by direct-current coupling. The signal can be led through a transmission path, in which an alternating-current coupling is applied, via the capacitor Cf and supplied. to the processing circuit for image correction outside the tube.

Now, electrostatic capacity of the capacitor Cf is to be examined. A dielectric of the capacitor Cf is made of a glass material composing the funnel 20. The relative dielectric constant $\chi$ of the glass material used for the funnel 20 is generally about 6.0. If the thickness of the glass as the dielectric forming the capacitor Cf is 5 mm, and each area of the electrodes 41 and 42 is 4 cm$^2$, the dielectric constant $\in_0$ in a vacuum is 8.85×10$^{-12}$ [C/Vm]. Therefore, the electric static capacity C of the capacitor Cf=4.25 pF, since C=$\chi\in_0$S/d. As will be described later, such small capacity is sufficient for processing by the processing circuit for image correction outside the tube.

Figure 3:
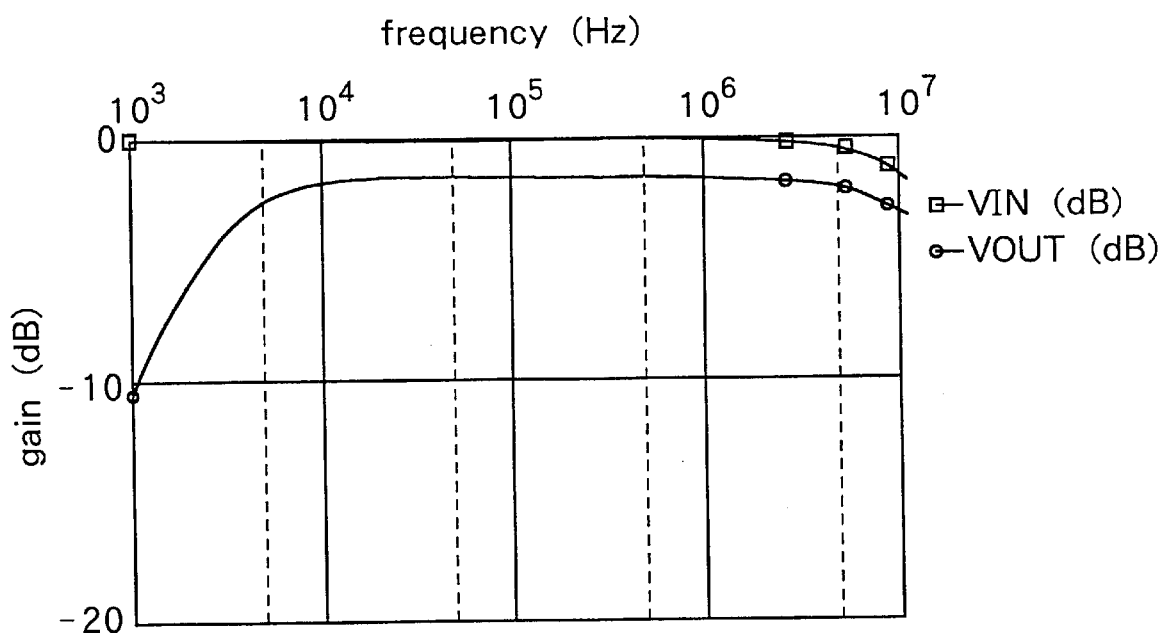
FIG. 3 is a characteristic figure showing the frequency characteristic of a periphery of the index electrode according to the first embodiment.

Next, circuit characteristics in the signal path of the detection signal from the index electrode 70 will be described with reference to FIG. 3. In FIG. 3 the axis of ordinates represents gain (dB), and the axis of abscissas represents frequency (Hz). This characteristic figure (FIG. 3) is obtained provided that specific characteristic values of each circuit element in the equivalent circuit shown in FIG. 2, are set as follows: the value of the resistance R1=1 k$\Omega$; the value of the stray capacitance Cs=10 pF; the value of the capacitor Cf=5 pF; the value of the input resistance Ri=10 M$\Omega$; and the value of the input capacitance Ci=1 pF. From the characteristic figure, the following is evident. First, the signal voltage VIN generated in the index electrode 70 starts to fall in a high-frequency band more than several MHz. This results from shunt effect by the capacitance Cs. Next, the low-pass characteristic of the output voltage VOUT inputted to the amplifier AMP1 is controlled by the cutoff frequency of the high-pass filter composed of the capacitor Cf and the input resistance Ri. At medium-frequency (10 kHz) and over, the ratio of the output voltage VOUT and the signal voltage VIN generated in the index electrode 70 is controlled by the ratio of capacitance of the capacitor Cf and the input capacitance Ci. In this specific example, signal detection with almost flat frequency characteristic can be performed from several kHz to about 10 MHz. The scan frequency in a common cathode ray tube lies within the range of several kHz and 100 kHz so that the frequency characteristic obtained in the example is sufficient in the circuit for the signal detection.

Figure 4:
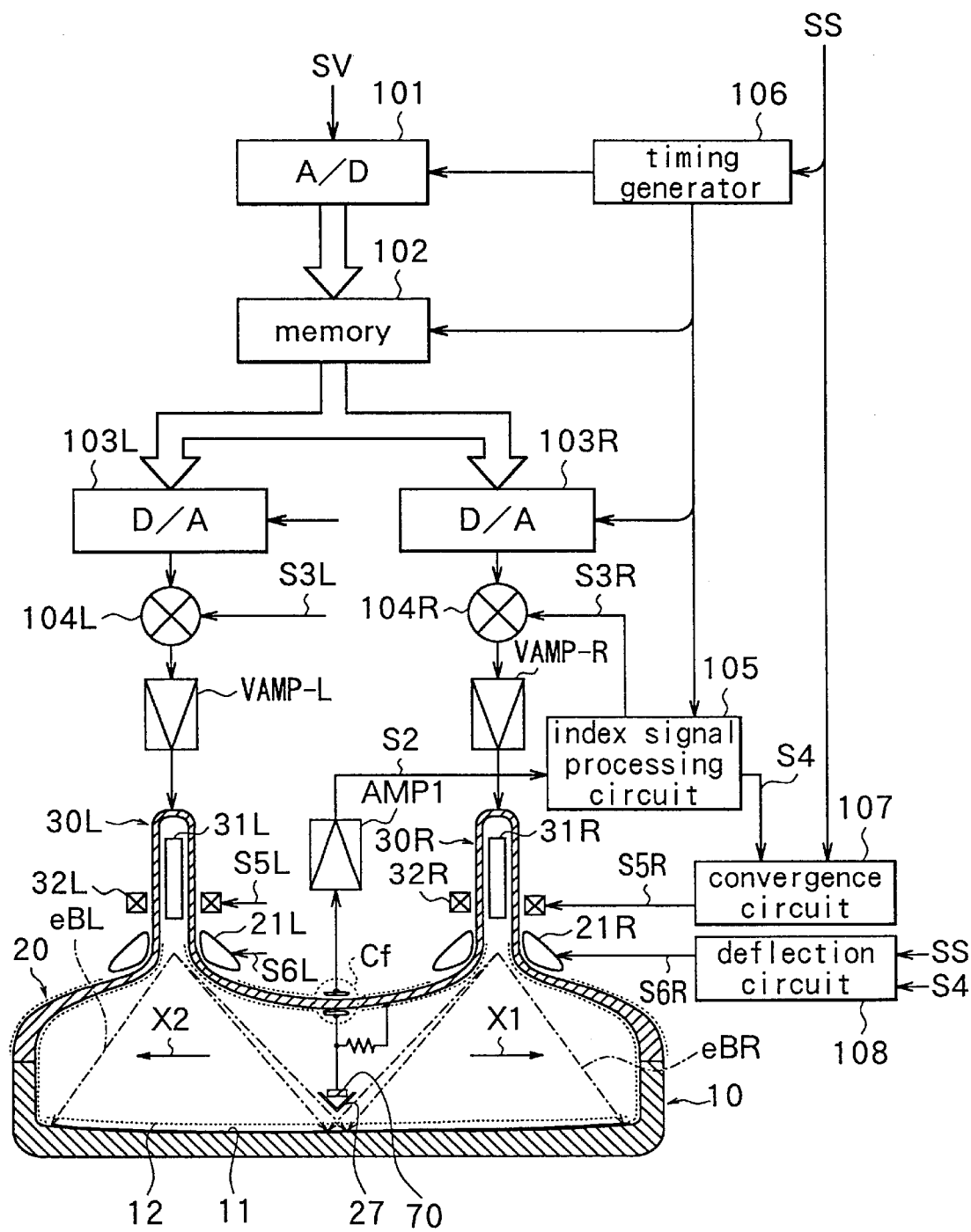
FIG. 4 is a block diagram showing a signal processing circuit in the cathode ray tube according to the first embodiment.

As shown in the FIG. 4, the cathode ray tube of the embodiment comprises: an A/D converter 101 for converting an inputted video signal SV from analog to digital (referred to as A/D in the following); a memory 102 for storing the video signal SV which is A/D converted by the A/D converter; a D/A converter 103L, to which signals necessary for drawing the left half of the screen and the area extending into the right half of the screen among the video signals SV stored in the memory 102 is inputted for converting this inputted signals from digital to analog (referred to as D/A in the following); a D/A converter 103R, to which signals necessary for drawing the right half of the screen and the area extending into the left half of the screen among the video signals SV stored in the memory 102 is inputted, for D/A converting this inputted signals; a modulator 104L for performing brilliance modulation on the video signal outputted from the D/A converter 103L based on a modulation signal S3L; a modulator 104R for performing brilliance modulation on the video signal outputted from the D/A converter 103R based on a modulation signal S3R; and video amplifiers VAMP-L and VAMP-R for amplifying each of the brilliance-modulated video signals outputted from the modulators 104L and 104R.

Furthermore, the cathode ray tube of the embodiment comprises: an index signal processing circuit 105, to which an index signal S2 outputted from the amplifier AMP1 is inputted, for outputting the modulation signals S3L and S3R, and a convergence/deflection correction signal S4; a timing generator 106 for outputting timing signals to the A/D converter 101, the memory 102, the D/A converters 103L and 103R, and the index signal processing circuit 105 based on a synchronous signal SS; a convergence circuit 107 for controlling convergence yokes 32L and 32R based on the convergence/deflection correction signal S4 from the index signal processing circuit 105; and a deflection circuit 108 for controlling deflection yokes 21L and 21R based on the convergence/deflection correction signal S4 from the index signal processing circuit 105.

The deflection yokes 21L and 21R, the convergence yokes 32L and 32R, the index signal processing circuit 105, the convergence circuit 107 and the deflection circuit 108 correspond to specific examples of "the control means" of the invention.

The index signal S2 is a signal corresponding to the detection signal from the index electrode 70. The image correcting method according to the embodiment using the index signal S2 will be described later. The modulation signals S3L and S3R are the signals for performing brilliance control of the joint area of the left and right divided screens. The image correcting method according to the embodiment using the modulation signals S3L and S3R will be also described later.

The memory 102 is composed of, for example, a line memory or a field memory, and stores the inputted video signals by, for example, every line unit or field unit. The operation of reading-out and writing signals in the memory 102 is controlled by a memory controller (not shown).

Next, operation of the cathode ray tube with the above-mentioned configuration will be described.

The A/D converter 101 (FIGS. 5A to 5E) A/D converts the inputted video signals SV. The video signals which have been digitized by the A/D converter are stored in the memory 102 by, for example, every line unit or field unit based on the control of the memory controller (not shown).

As an example, a case where the left and right divided screens of every H/2 (1 H is one horizontal scan period) are horizontally scanned in the opposite direction from each other from the center to the right or left side of the screen by each electron beam eBL and eBR will be described. The video signal of 1 Hwritten onto the memory 102 is H/2 divided under the control of the memory controller (not shown). The signal for the left screen among the divided signals are read out in the reverse direction of writing under the control of the memory controller (not shown), and are inputted to the D/A converter 103L. The signal for the right screen among the divided signals are read out in the same direction of writing under the control of the memory controller (not shown), and are inputted to the D/A converter 103R. The D/A converter 103L outputs the H/2 signal for the left screen, which has been inversely read out, to a modulator 104L after converting the H/2 signal to the analog signal. The D/A converter 103R outputs the H/2 signal for the right screen, which has been read out in the same direction of writing, to the modulator 104R after converting the H/2 signal to the analog signal.

Each of the modulators 104L and 104R outputs the inputted video signal, to which brilliance modulation is performed based on each modulation signal S3L and S3R, to the video amplifiers VAMP-L and VAMP-R. The signals inputted in each video amplifier VAMP-L and VAMP-R are amplified to a predetermined level, and are supplied as a cathode drive voltage to a cathode (not shown) provided inside of each electron gun 31L and 31R. Therefore, each electron beam eBL and eBR is emitted from each electron gun 31L and 31R. The cathode ray tube of the embodiment is capable of color display. In practice, the cathodes for each color R, G, and B are provided in each electron gun 31L and 31R, and the electron beams for each color are emitted from each electron gun 31L and 31R. The beam current of the electron beams for each color is separately controlled by each color, and thus the brilliance and chroma are adjusted.

The electron beams eBL and eBR for each color emitted from the electron guns 31L and 31R are converged by the magnetic function of the convergence yokes 32L and 32R, respectively, and are deflected by the magnetic function of the deflection yokes 21L and 21R. Thus, the electron beams scan the whole surface of the phosphor surface 11 and the desired image is displayed on the screen SA (FIGS. 1A and 1B) on the surface of the panel 10. At this time, the left half of the screen and the area extending into the right half of the screen are drawn by the electron beam eBL while the right half of the screen and the area extending into the left half of the screen are drawn by the electron beam eBR. A single screen SA is formed by partially joining the ends of the left and right divided screens.

When the electron beams eBL and eBR scan the over-scan region OS, and are irradiated and collided to the index electrode 70, voltage drop occurs in the index electrode 70. The signal according to the voltage drop is led out of the tube as a detection signal via the capacitor Cf provided in the funnel 20, and the index signal S2 is outputted from the amplifier AMP1. The index signal processing circuit 105 generates and outputs the modulation signals S3L and S3R for performing brilliance control based on the index signal S2. The index signal processing circuit 105 also outputs the convergence/deflection correction signal S4 based on the index signal S2. The convergence circuit 107 controls the convergence yokes 32L and 32R by outputting deflection current S5L and S5R based on the convergence/deflection correction signal S4. A deflection circuit 108 controls the deflection yokes 21L and 21R by outputting deflection current S6L and S6R based on the convergence/deflection correction signal S4. Therefore, the control of the scan position of each electron beam eBL and eBR is performed and image distortion or the like is corrected so that the left and right divided screens are appropriately joined and displayed.

Next, the image correcting method based on the index signal S2 will be described with reference to FIGS. 5A to 5E.

In the embodiment, detection of the scan position of the electron beams eBL and eBR is possible both in a horizontal direction (line scan direction) and a vertical direction (field scan direction) since notches 71 are provided in the conductive index electrode 70. Although only the electron beam eBR is illustrated in FIGS. 5A to 5E, the electron beam eBL works in the same manner. As described, in the embodiment, the line scan of the electron beam eBR is performed from left to right starting from the center of the screen, and the field scan is performed from the top to the bottom (Y direction in FIG. 5A).

In FIG. 5A, locus BY is the locus of scan starting points in a horizontal direction of the electron beam eBR before image correction. In the example shown in FIG. 5A, the locus BY of the electron beam eBR before image correction has a pincushion shape of which the center portion in a horizontal direction is contracted and the top and bottom portion in a horizontal direction is stretched. The locus BYO is the locus of scan starting points in a horizontal direction of the electron beam eBR after performing appropriate image correction. In the embodiment, in order to detect the position of the electron beam eBR, a plurality of (at least the number corresponding to the number of the notches 71) electron beams B1 to B5 for detecting positions is to be passed through in a horizontal direction in the over-scan region OS where the index electrode 70 is provided. In the following, described is a case where the image correction is appropriately performed and thus the electron beam is passed through almost the center of the plurality of notches 71 such as the electron beams B10 to B50 shown in FIGS. 5A to 5F. Incidentally, the number of electron beams for detecting positions passed through the index electrode 70 is not limited to the same number as the number of the notches 71.

When the electron beams B1 to B5 for position detection pass through the index electrode 70, as shown in FIG. 5B, the detection signal with two pulse signals is outputted. The two pulse signals are signals outputted by the electron beams B1 to B5 passing through the electrode portion on both ends of the notches 71. Time (th1 to th5) from the scan starting points (time: t=0) of the electron beams B1 to B5 to the edge of the first pulse signal represents amplitude of horizontal deflection and image distortion. The horizontal deflection is completely corrected by performing deflection control of the electron beam eBR so that the time becomes the predetermined fixed time th0.

FIG. 5C shows the detection signals outputted after the horizontal deflection has been corrected. As described, when the electron beams B1 to B5 pass through in the area where the notches 71 are provided in the index electrode 70, two pulse signals are outputted. The pulse intervals (tv1 to tv5) of this outputted pulse signals correspond to the position in an up-down direction (vertical direction) of the notches 71. Therefore, the vertical deflection is completely corrected through adjusting vertical amplitude and linearity by performing deflection control of the electron beam eBR so that the pulse intervals (tv1 to tv5) become the predetermined time tv0. When both horizontal deflection and vertical deflection are corrected, as shown in FIG. 5D outputted is the detection signal in which the time from the scan starting point (t=0) to the edge of the first pulse signal is the fixed time th0, and the pulse interval between two pulses is the predetermined time tv0. At this time, as shown in FIG. 5E, the electron beams B1a to B5a in an ideal state are to pass through almost the center portion of the plurality of notches 71.

Practically, analysis of the pulse interval of the detection signal outputted from the above-mentioned index electrode 70 is performed by the index signal processing circuit 105 (FIG. 4) analyzing the index signal S2 corresponding to the detection signal from the index electrode 70 obtained through the amplifier AMP1. The index signal processing circuit 105 outputs the convergence/deflection correction signal S4 based on the analysis of the index signal S2. The deflection circuit 108 controls the deflection yoke 21R based on the convergence/deflection correction signal S4. As a result, the control of the scan position of the electron beam eBR is performed and thus the image correction is performed so as to correct image distortion or the like.

The cathode ray tube of the embodiment is capable of performing color display and the electron beam eBR to be adjusted is for each color R,G and B. When the control of the convergence circuit 107 and the deflection circuit 108 is performed at the same time and adjustment is separately performed for each color, correction of the convergence can be automatized. By repeatedly performing such automatic control by every horizontal deflection scan while performing the vertical deflection scan, correction of image distortion, for example, with a pincushion shape like the locus BY shown in FIG. 5A can be automatically performed.

As described above, about the right half of the screen and the area extending into the left half of the screen, which are drawn by the electron beam eBR, are corrected. For the left electron beam eBL, by following the same steps the left side of the screen is corrected. By correcting the left and right divided screens as described, the left and right divided screens are appropriately joined and displayed. Only one index electrode 70 is provided so that the scan position of both electron beams eBL and eBR can not be completely detected simultaneously. Therefore, the left and right divided screens can not be corrected simultaneously. However, the left and right divided screens can be corrected through, for example, alternately detecting the electron beams eBL and eBR by every line scan or every field scan and alternately correcting the left and right divided screens.

Figures 6A, 6B, 6C, 6D, 6E:
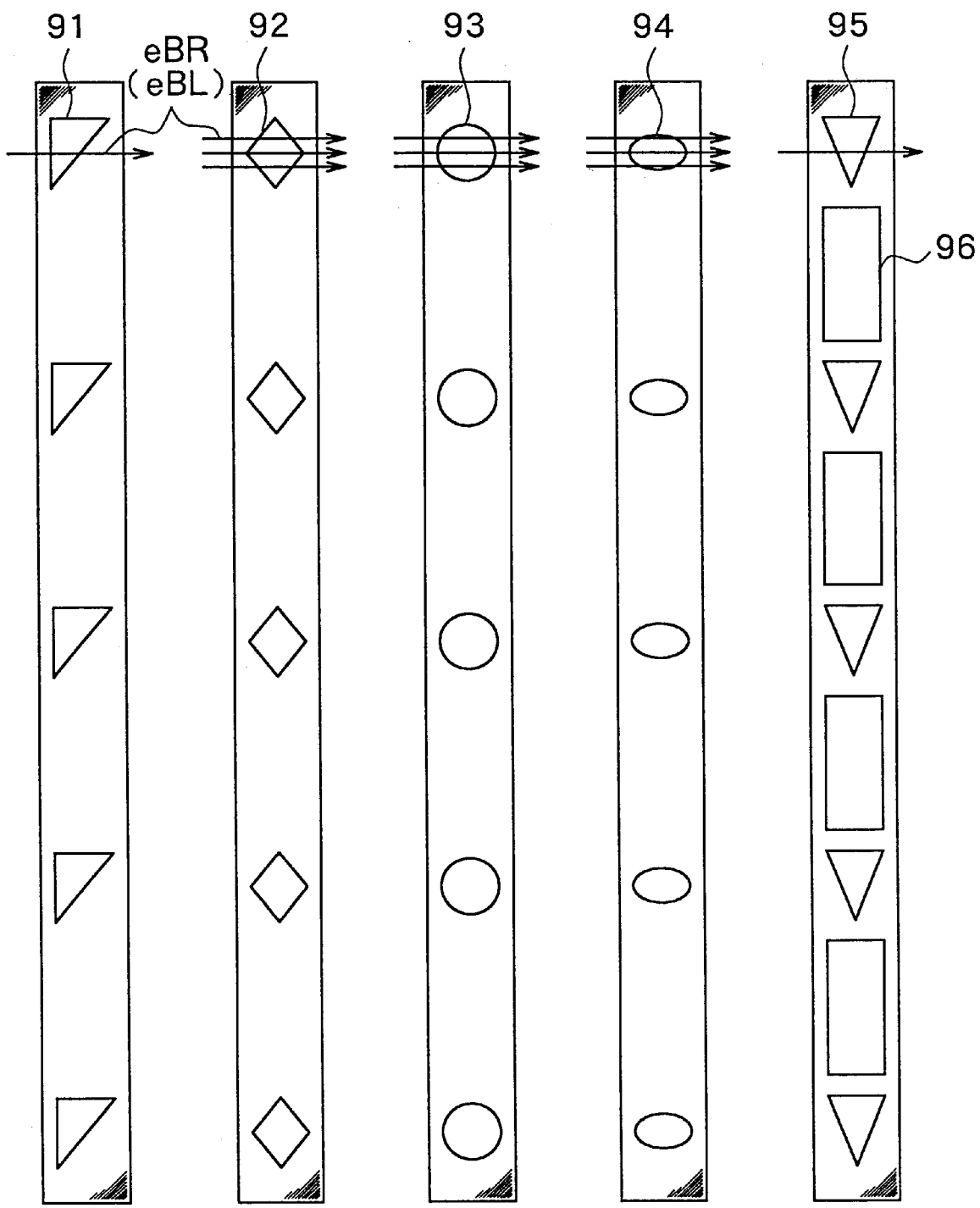
FIGS. 6A to 6E are figures showing other examples of the index electrode according to the first embodiment.

The shape of the notches provided in the index electrode 70 is not limited to the reverse triangle shape as described above but various shapes of notches as shown in FIGS. 6A to 6E can be used. In the example shown in FIG. 6A, the notches 91 have a right triangle shape which becomes smaller in a horizontal direction to a downward direction. When the electrode of the example shown in FIG. 6A is used, detection of the scan position of the electron beams eBL and eBR is basically the same as a case where the index electrode 70 shown in FIGS. 5A to 5E is used. FIGS. 6B, 6C and 6D are examples of electrodes in which notches 92 with a rhombus shape, notches 93 with a circular shape, and notches 94 with an ellipse shape are provided, respectively. In the examples shown in FIGS. 6B, 6C and 6D, it is necessary to pass through a plurality of (for example, three) electron beams in the center of one notch in order to obtain information on the position in a vertical direction since the shape of each notch is symmetry in a vertical direction. FIG. 6E shows an example in which notches 95 for detecting position are provided while notches 96 for decreasing the stray capacitance generated in the tube. In the example shown in FIG. 6E, the region which is not used for detecting position is cut out as the notches 96. The example has an advantage of decreasing the stray capacitance for the inside conductive film 22 and the beam shield 27 or the like in which the electrode is kept to anode voltage HV and improving high frequency characteristic of the detection signal.

In FIGS. 5A to 5E and FIGS. 6A to 6E, examples of one index electrode with five notches being provided is shown. However, it is not limited to five but the number of notches may be more or less than five. When image distortion includes a more complicated component of a high order, it is necessary to improve detection precision by increasing the number of notches. It is not necessary that a plurality of notches is provided at regular intervals.

In the above-mentioned description, each scan position of the electron beams eBL and eBR is detected by one index electrode 70. However, it is also possible to separately detect each scan position of the electron beams eBL and eBR by providing the plurality of index electrodes 70.

Figure 7A:
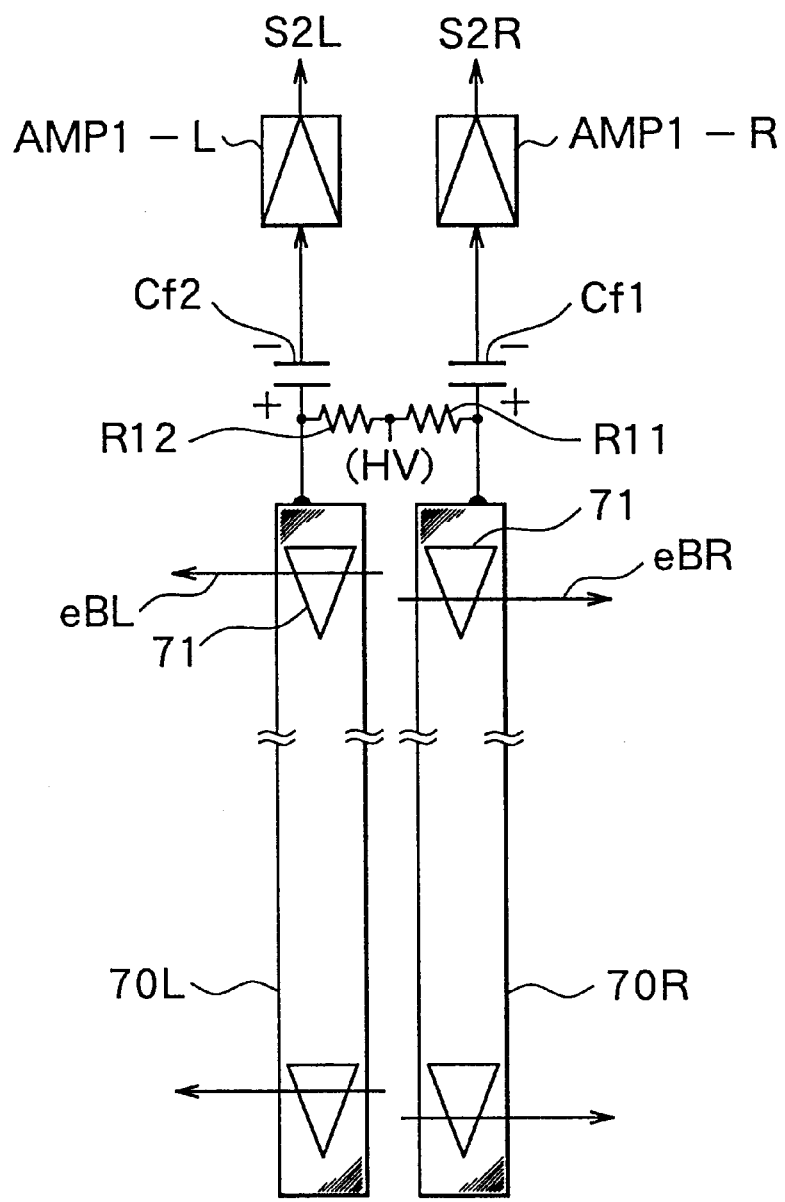
FIG. 7A is a figure showing still another example of the index electrode according to the first embodiment.

In FIG. 7A, only main structural components in a peripheral circuit of the index electrodes 70R and 70L are shown.

In the example shown in FIG. 7A, on the side of the joint of the left and right divided screens, the index electrode 70L is provided in the over-scan region of the electron beam eBL and the index electrode 70R is provided in the over-scan region of the electron beam eBR. Basic configuration of the index electrodes 70L and 70R is identical to the index electrode 70 shown in FIGS. 5A to 5E in which the plurality of notches 71 with the reverse triangle shape is provided in a longitudinal direction at regular intervals.

Also, the configuration of the peripheral circuit for leading the detection signal of the index electrodes 70L and 70R are basically identical to that of the index electrode 70. That is, as shown in FIG. 7A, the resistance R11 to which the anode voltage HV is supplied, and a plus electrode of the capacitor Cf1 are connected to the index electrode 70R. A minus electrode of the capacitor Cf1 is connected to the amplifier AMP1-R. Also, the resistance R12 to which the anode voltage HV is supplied, and a plus electrode of the capacitor Cf2 are connected to the index electrode 70L. A minus electrode of the capacitor Cf2 is connected to the amplifier AMP1-L. The capacitors Cf1 and Cf2 are formed by using a part of the funnel 20 like the capacitor Cf shown in FIGS. 1A and 1B. When each electrode beam eBR and eBL is irradiated and collided to the index electrodes 70R and 70L, voltage drop occurs separately in each electrode and the signals corresponding to the voltage drop are led out of the tube as a separate detection signal via the capacitors Cf1 and Cf2, respectively. The detection signals from each electrode which have been led out of the tube are outputted as separate index signals S2R and S2L through the amplifiers AMP1-R and AMP1-L, respectively. By separately processing these separate index signals S2R and S2L in the processing circuit outside the tube, it becomes possible to detect each scan position of the electron beams eBL and eBR separately and simultaneously, and to correct the left and right divided screens simultaneously.

Figure 7B:
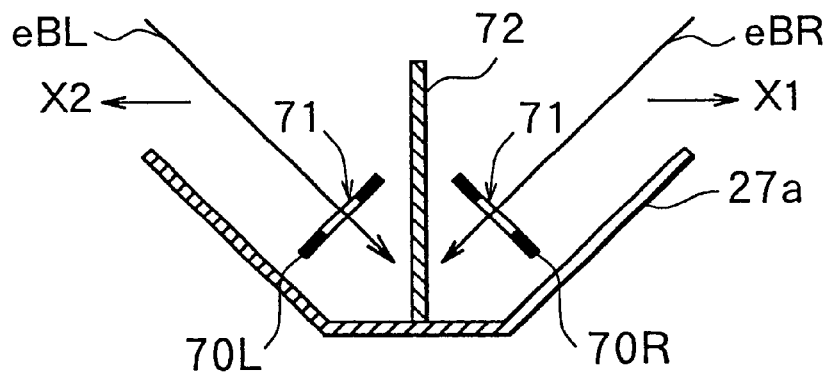
FIG. 7B is a top view showing a periphery of the index electrode according to the first embodiment.

Between the index electrodes 70L and 70R, and the phosphor surface 11 (not shown in FIGS. 7A and 7B), for example, as shown in FIG. 7B, a beam shield 27a with a mountain like shape is located. In the center of the beam shield 27a, a shield plate 72 for shielding each of the electrode beams eBL and eBR is provided. The index electrodes 70L and 70R are respectively provided on the left and right sides of the shield plate 72 provided in the center of the beam shield 27a. In FIG. 7B, an example in which the index electrodes 70L and 70R are located obliquely to the phosphor surface 11 is shown. However, the index electrodes 70L and 70R may not be located in such a manner but may be located facing the phosphor surface 11.

Next, modulation control of brilliance will be described with reference to FIG. 8 to FIG. 11.

Figure 8:
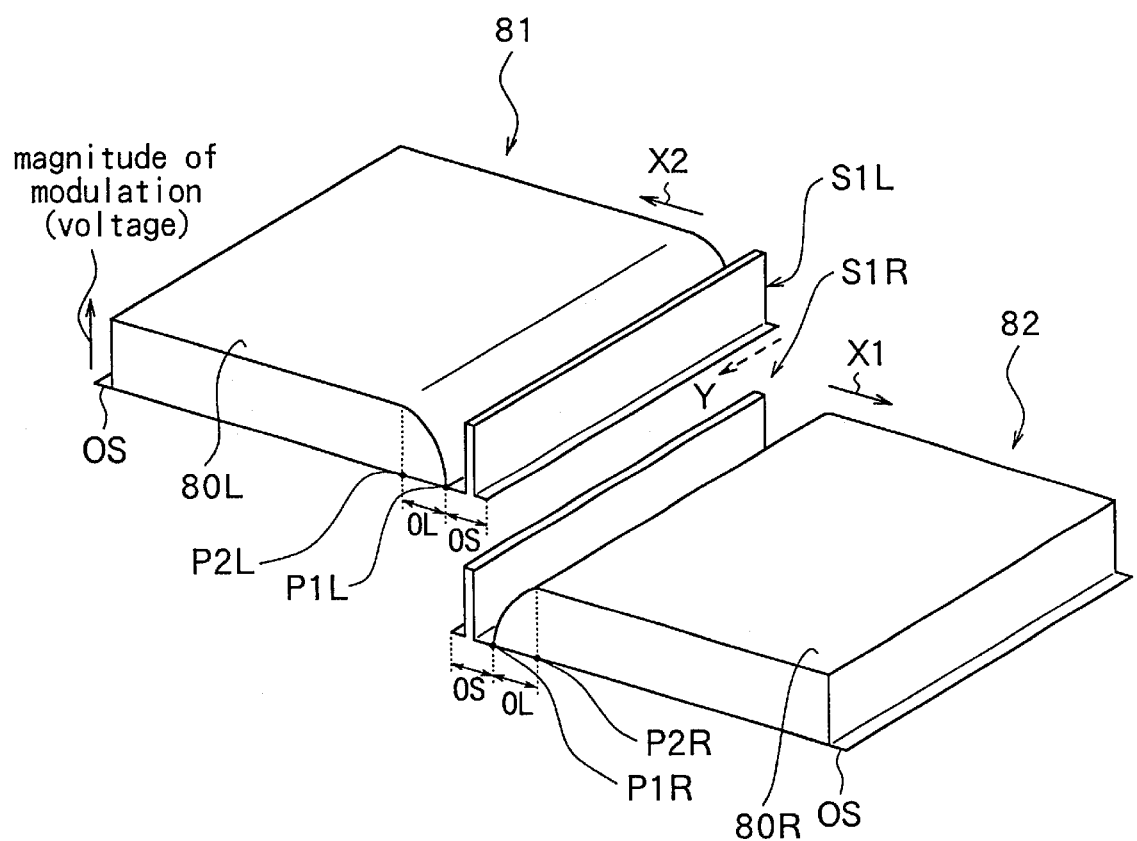
FIG. 8 is a figure showing the correlation of the position of each divided screen and a wave of a modulation signal of brilliance according to the first embodiment three-dimensionally.

In the above-described image correction, positional correction of image is performed by controlling the scan position of the electron beams eBL and eBR so that the left and right divided screens are appropriately joined. However, in the embodiment, in order to additionally adjust brilliance in the overlap region OL of the left and right divided screens, processing by modulation of signals is performed on the video signal corresponding to the overlap region OL. FIG. 8 is an explanatory figure showing an outline of modulation performed on the video signal, and represents the correlation of the position of each divided screen and the wave of the modulation signal three-dimensionally. In FIG. 8, the area represented by a code 81 corresponds to the left divided screen, and the area represented by a code 82 corresponds to the right divided screen. In the over-scan region OS on the side of the joint of each divided screen 81 and 82, as described above, the detection signals are outputted by each electron beam eBL and eBR scanning the index electrode 70. Moreover, FIG. 8 shows the waves of index drive signals S1L and S1R which are drive signals for scaning in the over-scan region OS of each electron beam eBL and eBR.

In the embodiment, as represented by the modulation waves 80L and 80R in FIG. 8, drawing is started at the starting points P1L and P1R of the overlap region OL in each divided screen 81 and 82, and modulation of the voltage of the video signal is performed by gradually increasing amplitude of the drawing so that a volume of the drawing becomes maximum at the endpoints P2L and P2R of the overlap region OL. Thereafter in a region other than the overlap region OL, the amount of the modulation is maintained to the right and left ends of the screen. The joint area of both screens can be inconspicuous provided that such modulation is simultaneously performed on each divided screen 81 and 82, and control is performed so that the sum of brilliance of both screens is constant at any position.

The method of modulation in the overlap region OL will be further considered in detail. In general, brilliance of a cathode ray tube is proportional to the cathode current Ik of the electron guns 31L and 31R (FIGS. 1A and 1B). The correlation of the cathode current Ik and the cathode drive voltage Vk which is applied to the cathode of the electron guns 31L and 31R is represented by a formula (1). In the formula (1), γ is a characteristic constant of the cathode ray tube and the value is, for example about 2.6. When modulation is to be performed on the video signals outputted from the D/A converters 103L and 103R (FIG. 4), it is necessary to consider gamma characteristic of the modulation voltage since, as described, there is a nonlinear correlation between the cathode drive voltage Vk and the cathode current Ik.

$$Ik \propto Vk^\gamma \qquad (1)$$

Figure 9:
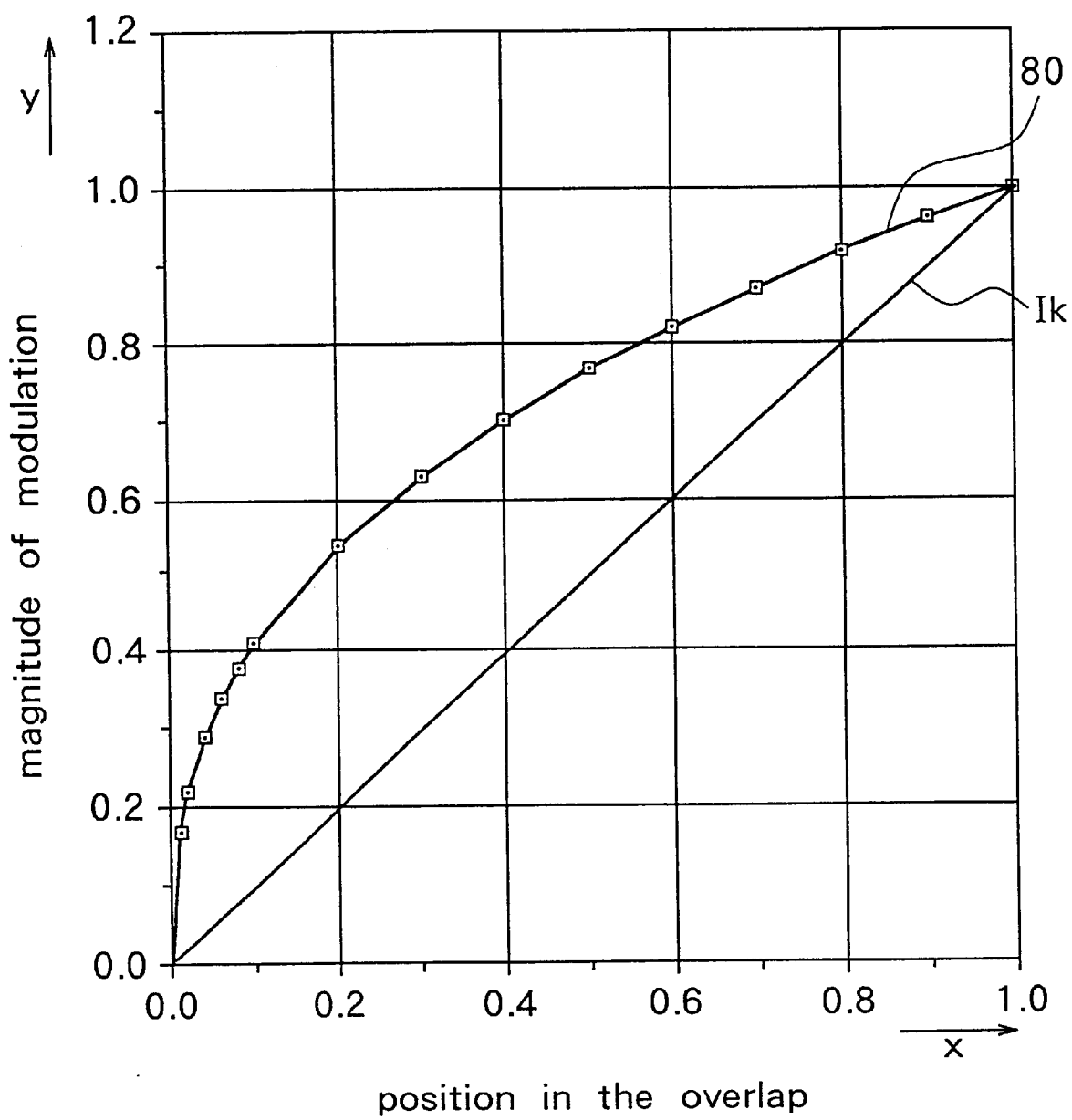
FIG. 9 is a graph showing the correlation of a cathode current corresponding to brilliance and a wave of a modulation voltage in the cathode ray tube according to the first embodiment.

The axis of abscissas shown in the FIG. 9 represents the position in the overlap region OL and the endpoints P2L and P2R of the overlap region OL are standardized to 1.0 with the starting points P1L and P1R being the origin. The axis of ordinates in FIG. 9 represents the amount of modulation (voltage). As shown in FIG. 9, for example, the modulation wave 80 describes a curve with an upward-convex shape so that the slope of the brilliance (cathode current: Ik) in each divided screen 81 and 82 is a straight line. At this time, the modulation wave 80 corresponds to the modulation waves 80L and 80R in the overlap region OL shown in FIG. 8, and is obtained by the following formula (2) based on the formula (1). The formula (2) is a function in which the cathode current Ik is a variable. The following formula (3) is a formula in which Ik=x is applied to the formula (2). The modulation wave 80 in FIG. 8 is represented by the formula (3). The sum of the brilliance in the overlap region OL can be kept to a constant value by simultaneously performing such modulation on each divided screen 81 and 82.

$$y = 10^{1/\gamma \cdot \log Ik} \qquad (2)$$

$$y = 10^{1/\gamma \cdot \log x} \qquad (3)$$

Figure 10:
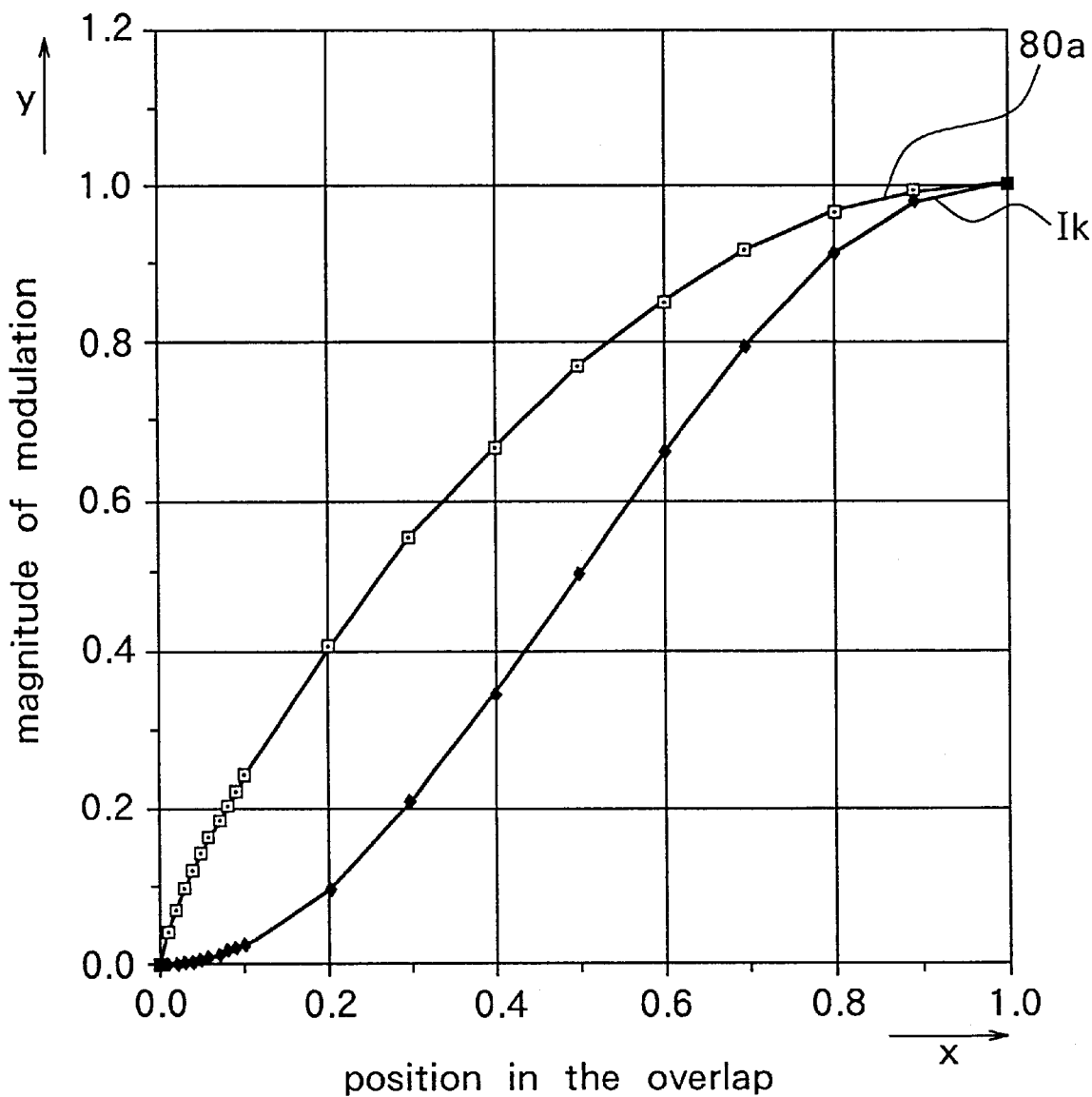
FIG. 10 is a graph showing another example of the correlation of the cathode current corresponding to brilliance and the wave of the modulation voltage in the cathode ray tube according to the first embodiment.

FIG. 10 is a figure showing another example of the correlation of the cathode current Ik corresponding to the brilliance and the wave of the modulation voltage. In FIG. 9, the slopes of each divided screen 81 and 82 are a straight line. However, modulation of a function (for example, cosine function) is possible in which a derivative (differential coefficient) of the brilliance (cathode current Ik) changes in both ends of the overlap region OL is zero. In the example shown in FIG. 10, the cathode current Ik corresponding to the brilliance is a function represented by {½(1−cosπx)}. Accordingly, the modulation wave 80*a* in FIG. 10 is represented by the following formula (4). When such brilliance modulation is performed, the brilliance change in the overlap region OL becomes more natural to look at and it leaves more space for errors in the position of the joint area of the left and right divided screens.

$$y = 10^{1/\gamma \cdot \log\{\frac{1}{2}(1-\cos\pi x)\}} \quad (4)$$

A function in which a derivative (differential coefficient) of the brilliance change as shown in FIG. 10 is zero is innumerably given. For example, it may be a function in which a parabolic (quadratic) curve is compounded.

The control of modulation described above is practically performed as follows: the index signal processing circuit 105 (FIG. 4) judges scan timing of each electron beam eBL and eBR which scans the starting points P1L and P1R of the overlap region OL based on the index signal S2 from the index electrode 70 and the timing signal from the timing generator 106; and the modulation signals S3L and S3R are outputted to the modulators 104L and 104R so that modulation of the left and right video signals divided in the memory 102 is started from the starting points P1L and P1R of the overlap region OL. The modulator 104L and 104R perform modulation of the left and right video signals based on the modulation signals S3L and S3R from the index signal processing circuit 105. The modulated left and right video signals are inputted to each video amplifier VAMP-L and VAMP-R and are amplified to a predetermined level, respectively. Then, the signals are supplied as the cathode drive voltage to the cathode (not shown) located inside each electron gun 31L and 31R. Hence, the electron beams eBL and eBR on which modulation is performed are projected from each electron gun 31L and 31R.

Figure 11:
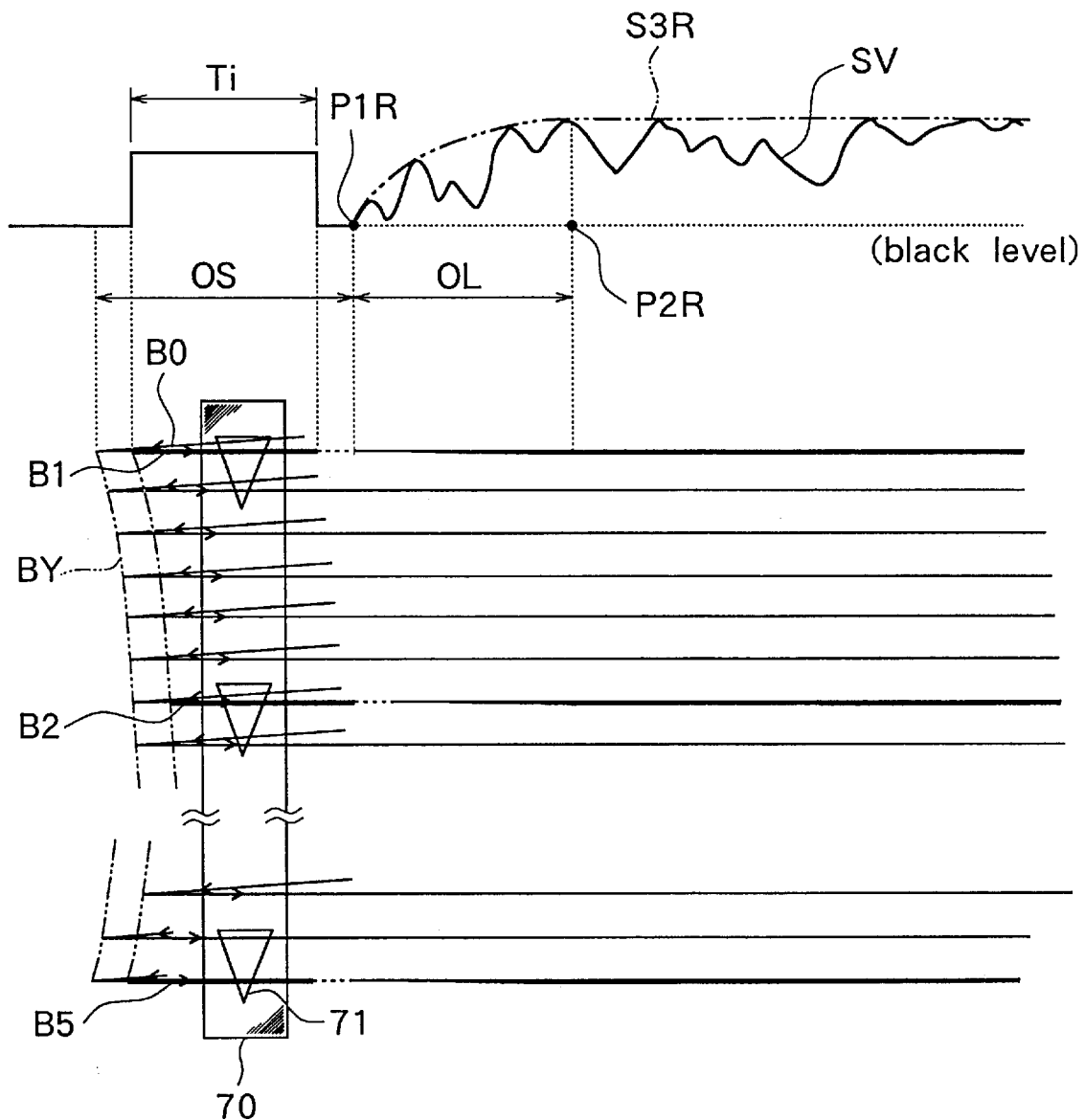
FIG. 11 is a figure showing the correlation of scan positions of electron beams and timing of modulation control of brilliance in the cathode ray tube according to the first embodiment.

FIG. 11 is a figure showing the correlation of the scan position of electron beams and the timing of modulation control of brilliance. In this figure, although only the electron beam eBR on the right side is shown but the electron beam eBL on the left side is the same. In the embodiment, as described referring to FIGS. 5A to 5E, a plurality of electron beams B1 and B2 for detecting position is to scan on the index electrode 70 in the over-scan region OS. In FIG. 11, Ti indicates the time when the plurality of electron beams B1 and B2 for detecting position is being outputted based on the index drive signal S1R shown in FIG. 8. FIG. 11 also shows a flyback BO of the electron beams B1 and B2. When the electron beams shift from the overfscan region OS to the overlap region OL, scan based on the video signal SV from the starting point P1R is performed. The modulation signal S3R is outputted from the index signal processing circuit 105 synchronizing with the starting point P1R.

The timing of performing image correction including the position control of each electron beam eBL and eBR based on the above-mentioned index signal S2 and the modulation control of brilliance can be optionally set. For example, the image correction can be performed at the time of starting the cathode ray tube, can be performed intermittently with a constant interval or can be performed at all times. In addition, the control of each electron beam eBL and eBR may be performed alternatively. Also, even if the set position or direction of the cathode ray tube is changed during its operation, image distortion and the like generated by the outside surroundings such as geomagnetism can be automatically corrected provided that the correction result of the electron beams eBL and eBR is reflected to the next field scan of each electron beam eBL and eBR (so-called feed back loop). In addition, when the scan screen changes because of the changes of each processing circuit over time, it is possible to reduce the influence of the change automatically and display the appropriate image. When the operation of each processing circuit is stable and the set position is steady, it is sufficient that the correction is performed only at the time of starting the cathode ray tube. As described, in the embodiment, the influence on position and brilliance of the displayed image caused by the change of outside surroundings such as geomagnetism or the change of each processing circuit over time is automatically corrected, and the left and right divided screens are appropriately joined to be displayed.

As described, in the tube of the embodiment, the index electrode 70 for outputting the electric detection signal according to the incidence of the electron beams eBL and eBR is provided in the over-scan region OS of the electron beams eBL and eBR on the side of the joit of the neighboring left and right divided screens. As a result, even though the tube has a simple structure and composition, the scan position of the electron beams eBL and eBR can be easily detected. Also, the control of the scan position of the electron beams eBL and eBR is performed based on the detection signal outputted from the index electrode 70 so that the correction of image display such as amplitude of the screen scan., image distortion and mis-convergence can be automatically performed based on the detected scan position. In addition, in the embodiment, the notches 71 are provided in the index electrode 70. As a result, the electron beam in a horizontal direction and a vertical direction can be detected, and the image correction in a horizontal direction and a vertical direction can be performed.

Therefore, according to the embodiment, image display control can be performed so that based on the detection signal outputted from the index electrode 70, the left and right divided screens are joined in an appropriate positional relationship. Also, according to the embodiment, image display control is performed so that the brilliance change in the joint area becomes inconspicuous since the modulation control of brilliance at the joint area is performed based on the detection signal outputted from the index electrode 70. As described, according to the embodiment, the position and brilliance of the left and right divided screens can be inconspicuously joined and excellent image display can be performed. Furthermore, the cathode ray tube of the embodiment performs image display using two electron guns 31L and 31R so that the distance from the electron guns to the phosphor surface can be shortened as compared to a cathode ray tube using a single electron gun and the depth can be shortened. Therefore, image display with fine focus characteristic (small image magnification) can be performed. Further, as the tube is provided with two electron guns 31L and 31R, brilliance intensification as well as miniaturization can be easily realized even in a tube having a large screen.

Second Embodiment

Figure 12:
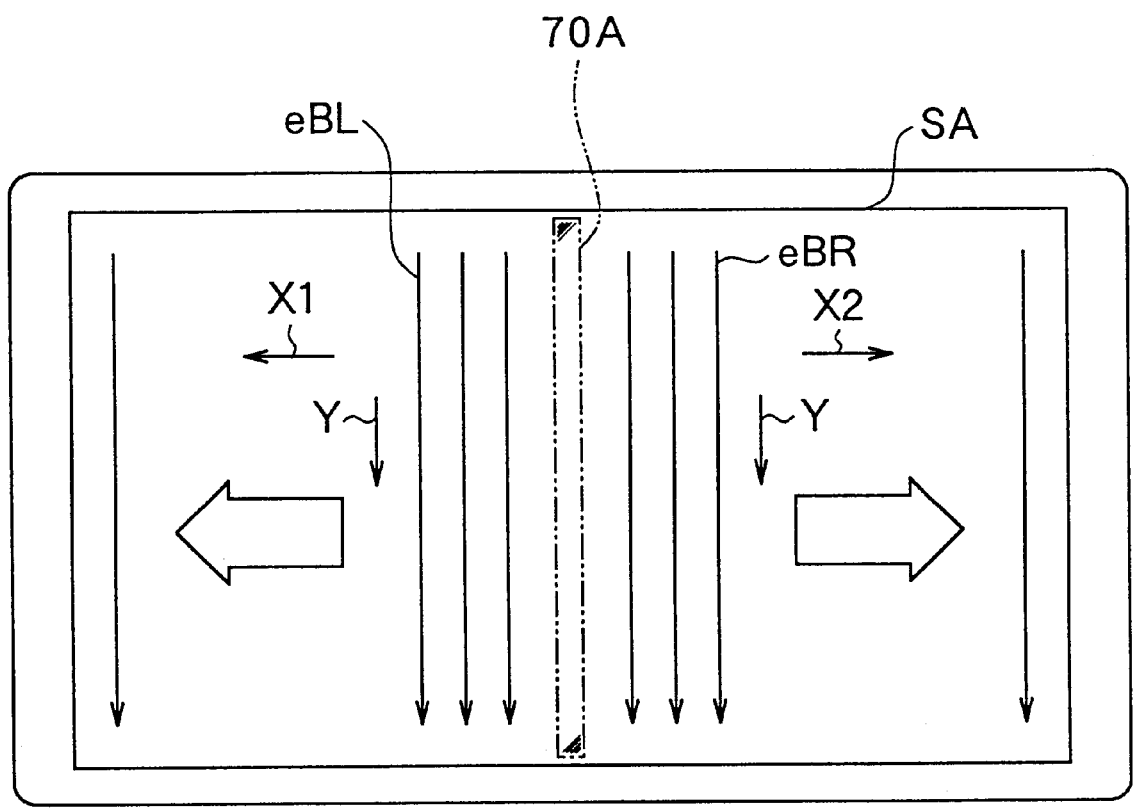
FIG. 12 is a figure showing scan directions of electron beams in a cathode ray tube according to a second embodiment.

In the above-mentioned first embodiment, a case where the line scan of each electron beam eBL and eBR is performed in a horizontal direction and the field scan is performed from the top to the bottom is described. In the second embodiment, as shown in FIG. 12, the line scan of each electron beam eBL and eBR is performed from the top to the bottom (Y direction in FIG. 12) and the field scan is performed in the opposite direction (X1 and X2 direction in FIG. 12) from each other from the center to the right or left side of the screen in a horizontal direction. As described, in the embodiment, the line scan and field scan of each electron beam eBL and eBR are performed in a reversed manner of the first embodiment.

In the cathode ray tube of the embodiment, the video signal SV which has been digitalized by the A/D converter 101 (FIG. 4) is stored in a memory 102 by, for example, every field unit based on the control of a memory controller (not shown). One field unit of the video signal stored in the memory 102 is roughly divided into two for the left and right divided screens under the control of the memory controller (not shown). Each video signal stored by one field unit is divided by every H2 (1H is one horizontal scan period) on each screen. In the cathode ray tube of the embodiment, the line scan is performed from the top to the bottom by the signal divided by every H/2 while the field scan is performed from the center to the right or left side of the screen in a horizontal direction, and the image of one field is formed in an effective screen SA.

FIGS. 13A to 13G are figures showing the configuration of an index electrode used in the cathode ray tube of the embodiment and an example of the wave of the detection signal outputted from the index electrode. In FIGS. 13A to 13G, the left side of the sheet corresponds to the upper part of the screen and the right side of the sheet corresponds to the lower part of the screen. An index electrode 70A of the embodiment comprises rectangular notches 131 being provided with their longitudinal direction being vertical to the line scan direction (Y direction) of the electron beams eBb and eBR; and slender notches 132 provided being oblique to the field scan direction (X1 and X2 direction in FIG. 12) of the electron beams eBL and eBR. A plurality of notches 131 and 132 is provided alternately. As a result, in the example shown in FIGS. 13A and 13D, the notches 131 are positioned on both ends of the index electrode 70A. The neighboring notches 131 are placed at even intervals. The neighboring notches 132 are also placed at even intervals.

In the index electrode 70A, as shown in FIG. 13A, when two electron beams eB1 and eB2 for detecting position pass through in a line scan direction, the detection signals each shown in FIGS. 13B and 13C are outputted. In FIGS. 13B and 13C, the amplitude and position of the line scan of the electron beams eB1 and eB2 are detected from the time $T_T$ and $T_B$ shown in the both ends. Inconsistency in the time T13, T35, T57 and T79 in which the electron beams eB1 and eB2 are passing through the neighboring notches 131 represents the quality of linearity characteristic of the line scan Also, the position of the pulse signal (pulses 1 to 4 in FIG. 13C) generated at the time of the electron beams eB1 and eB2 passing through the oblique notches 132 shows the information on amplitude of the field scan.

FIG. 13E shows the detection signal outputted from the index electrode 70A when an electron beam eB3 with pincushion distortion passes through as shown in FIG. 13D. FIG. 13F shows the detection signal outputted from the index electrode 70A when an electron beam eB4 with barrel distortion passes through as shown in FIG. 13D. FIG. 13G shows the detection signal which is outputted when there is an electron beam eB5 passing through almost the center of the index electrode 70A in a longitudinal direction. As evident from these figures, the detection signals with different waves are outputted from the index electrode 70A according to the difference of the scan position and scan timing of the passing electron beams eBL and eBR. Therefore, for example, the path of each electron beam eBL and eBR on the index electrode 70A can be estimated by observing and analyzing the phase of a pulse signal line when the electron beams eBL and eBR pass through each of the notches 131 and 132.

Practically, analysis o f the phase of the pulse signal line is performed by the index signal processing circuit 105 (FIG. 4) analyzing the index signal S2 which corresponds to the detection signal from the index electrode 70A obtained via the amplifier AMP1. The index signal processing circuit 105 outputs the convergence/deflection correction signal S4 based on the analysis of the index signal S2. The deflection circuit 108 controls the deflection yoke 21R based on the convergence/deflection correction signal S4. Therefore, the control of the scan position of each electron beam eBL and eBR is performed and the image correction is performed so that image distortion or the like is corrected.

In the embodiment, the left and right divided screens are appropriately joined and displayed by performing such image correction on both left and right divided screens. Only one index electrode 70A is provided so that the scan position of the electron beams eBL and eBR can not be completely detected simultaneously. Therefore, the left and right divided screens can not be corrected simultaneously. However, the left and right divided screens can be corrected by, for example, alternately detecting the scan position of the electron beams eBL and eBR by every line scan or field scan and alternately correcting the left and right divided screens.

In FIGS. 13A to 13G, an example in which nine notches are provided in the index electrode 70A is shown. However, the number of notches to be provided is not limited to nine but may be more or less. When image distortion includes a more complicated component of a high order, it is necessary to improve detection precision by increasing the number of notches. The above-mentioned embodiment is an example in which each of the notches 131 and 132 is provided at even intervals. However, it is not necessary that a plurality of notches 131 and 132 is provided at regular intervals.

In the above-mentioned description, each scan position of the electron beams eBL and eBR is detected by one index electrode 70. However, it is also possible to separately detect each scan position of the electron beams eBL and eBR by providing a plurality of index electrodes 70. The configuration of the electrode and its peripheral structure when providing the plurality of index electrodes 70A is identical to the one described by referring to FIG. 7 in the first embodiment. By providing the plurality of index electrodes 70A, the scan position of the electron beams eBL and eBR can be separately and simultaneously detected and the left and right divided screens can be simultaneously corrected.

As described, according to the embodiment, for example, in a case where the line scan of each electron beam eBL and eBR is performed from the top to the bottom and the field scan is performed in the opposite direction from each other from the center to the right or left side of the screen in a horizontal direction, the left and right divided screens are joined so that the joint area becomes inconspicuous and excellent image display can be performed.

Other configuration, operation and effects of the embodiment are identical to those of the first embodiment.

Third Embodiment

In the first and second embodiments, a conductive electrode which generates electric detective signals according to the incidence of each electron beam eBa and eBR is provided in the over-scan region OS on the side of the joint of the neighboring divided screens. However, in a third embodiment, a member which emits light according to the incidence of the electron beam is provided.

Figure 14:
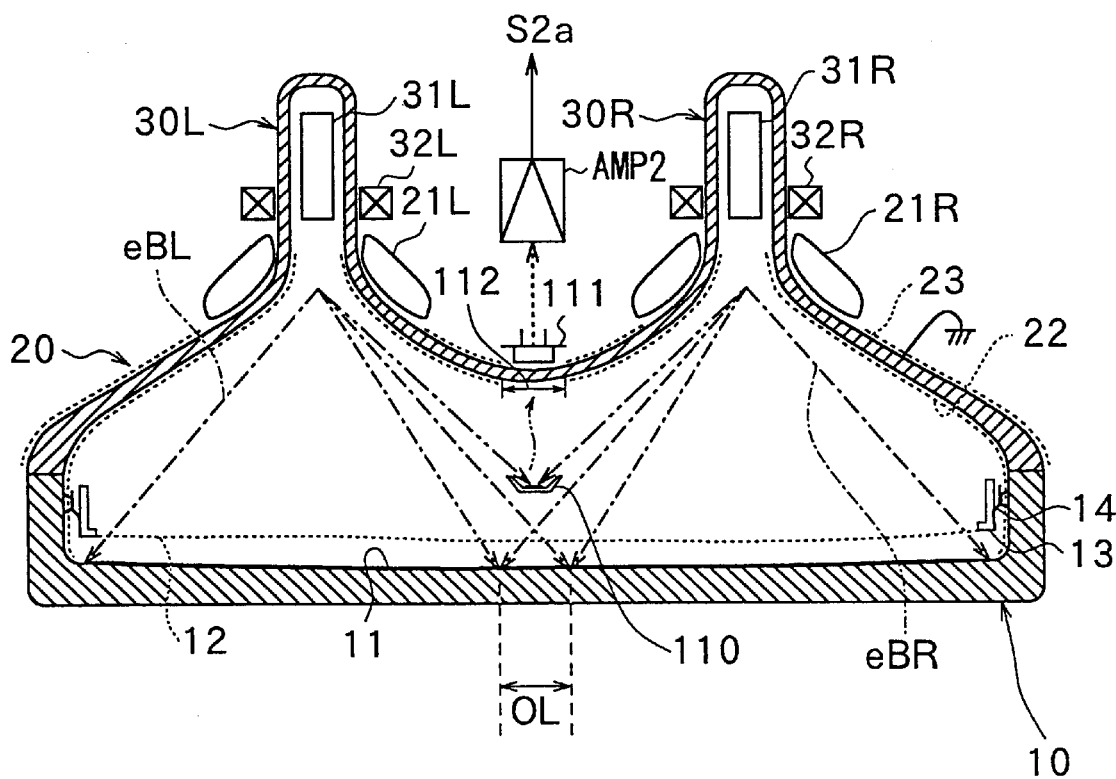
FIG. 14 is a top cross section showing a cathode ray tube according to a third embodiment.

FIG. 14 is diagram showing a structure of a cathode ray tube according to the third embodiment of the invention. In the cathode ray tube of the embodiment, an index plate i1o which emits light according to the incidence of each electron beam eBL and eBR is placed in a position corresponding to the index electrode 70 shown in FIGS. 1A and 1B Also, in the cathode ray tube of the embodiment, an optical transparent detection window for detecting light emitted from the index plate 110 is provided in a region 112 corresponding to the index plate 110 in the funnel 20. A light detector 111 is provided in a position corresponding to the detection window on the outer side of the funnel 20 (outside the tube). The light detector 111 corresponds to a specific example of "means for light detection" of the invention.

The light detector 111 detects light emitted from the index plate 110 and outputs the detected light after converting the detected light to an electric signal. The amplifier AMP2 amplifies the signal outputted from the light detector 111 and outputs the signal as an index signal S2a. The index signal S2a outputted from the amplifier AMP2, like the first and second embodiments, is inputted to the index signal processing circuit 105 (FIG. 4), and is used for control and the like of the scan position in the joint area of each electron beam eBL ad eBR. The image correcting method using the index signal S2a is identical to that of the first and second embodiments.

Figures 15A, 15B:
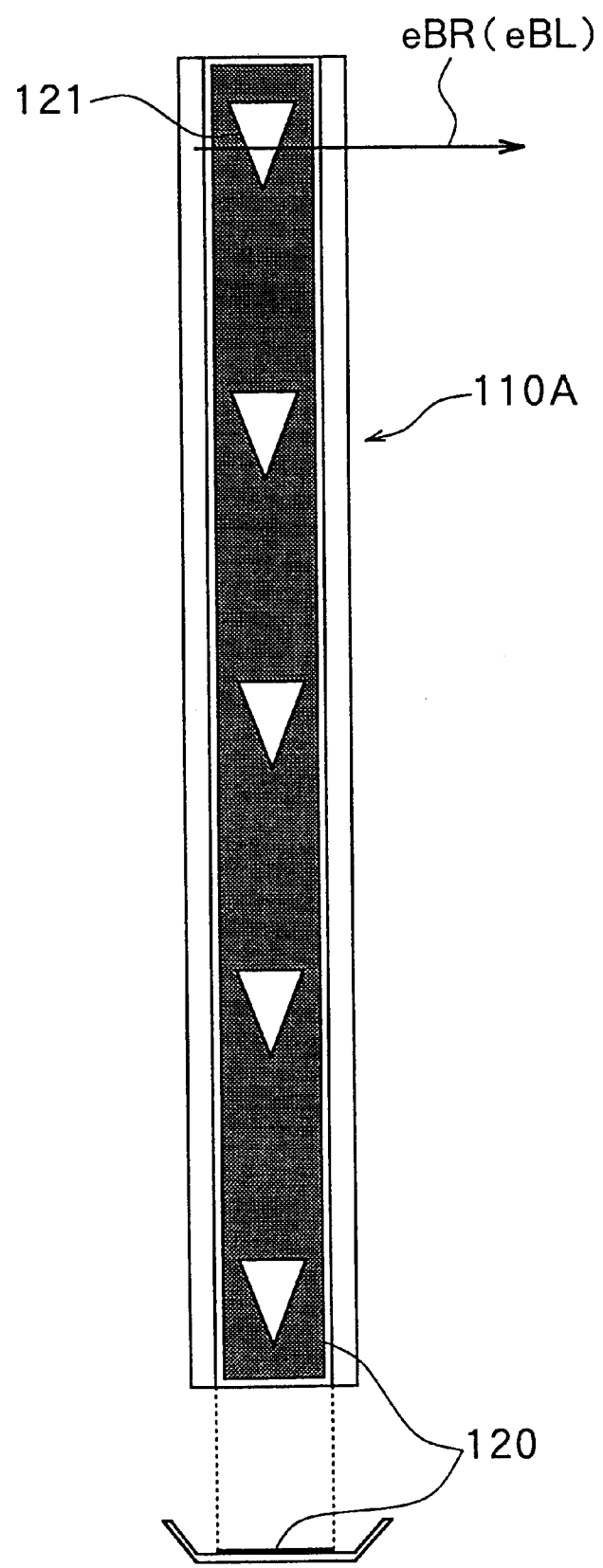
FIGS. 15A and 15B are figures showing an index plate according to the third embodiment.

An index plate 110A shown in FIGS. 15A and 15B, similarity to the index electrode 70 shown in FIG. 5A, can be used, for example, in a case where the line scan of each electron beam eBL and eBR is performed in a horizontal direction and field scan is performed from the top to the bottom.

The index plate 110A is, as shown in FIG. 15A, formed of a rectangular plate member. In the index plate 110, a phosphor 120 which emits light according to the incidence of the electron beams eBL and eBR is provided. As the phosphor 120, for example, the one with a short-afterglow characteristic is preferable. For example, P37 (ZnS: Ag,Ni), P46 ($Y_3Al_5O_{12}$: Ce), P47 ($Y_2SiO_5$: Ce) and the like can be used. The phosphor 120 is provided in the whole center area of the index plate 110A in a longitudinal direction so that reverse triangle patterns like the notches 71 provided in the index electrode 70 shown in FIG. 5A are formed therein. In FIG. 15A, a plurality of regions with a reverse triangle shape represented by a code 121 is regions where the phosphor 120 is not provided. The pattern formed by the phosphor 120 is not limited to the one shown in FIG. 15A. For example, a variety of patterns like the patterns of notches in each index electrode shown in FIGS. 6A to 6E can be applied. As described, the phosphor 120 is formed so as to have a predetermined pattern. Therefore, the portion where the phosphor 120 is provided emits light intermittently when each electrode beam eBL and eBR passes through on the index plate 110A. The pattern of emission can be corresponded to that of the electric detection signal detected in the index electrode 70.

As shown in FIG. 15B, by bending the sides of the index plate 110A to a mountain-like shape, unnecessary emission of the phosphor surface 11 outside the index plate 110A can be suppressed when the electron beams eBL and eBR are scanning the index plate 110A. In other words, effects identical to those of the beam shield 27 shown in FIGS. 1A and 1B can be obtained.

Figures 16A, 16B:
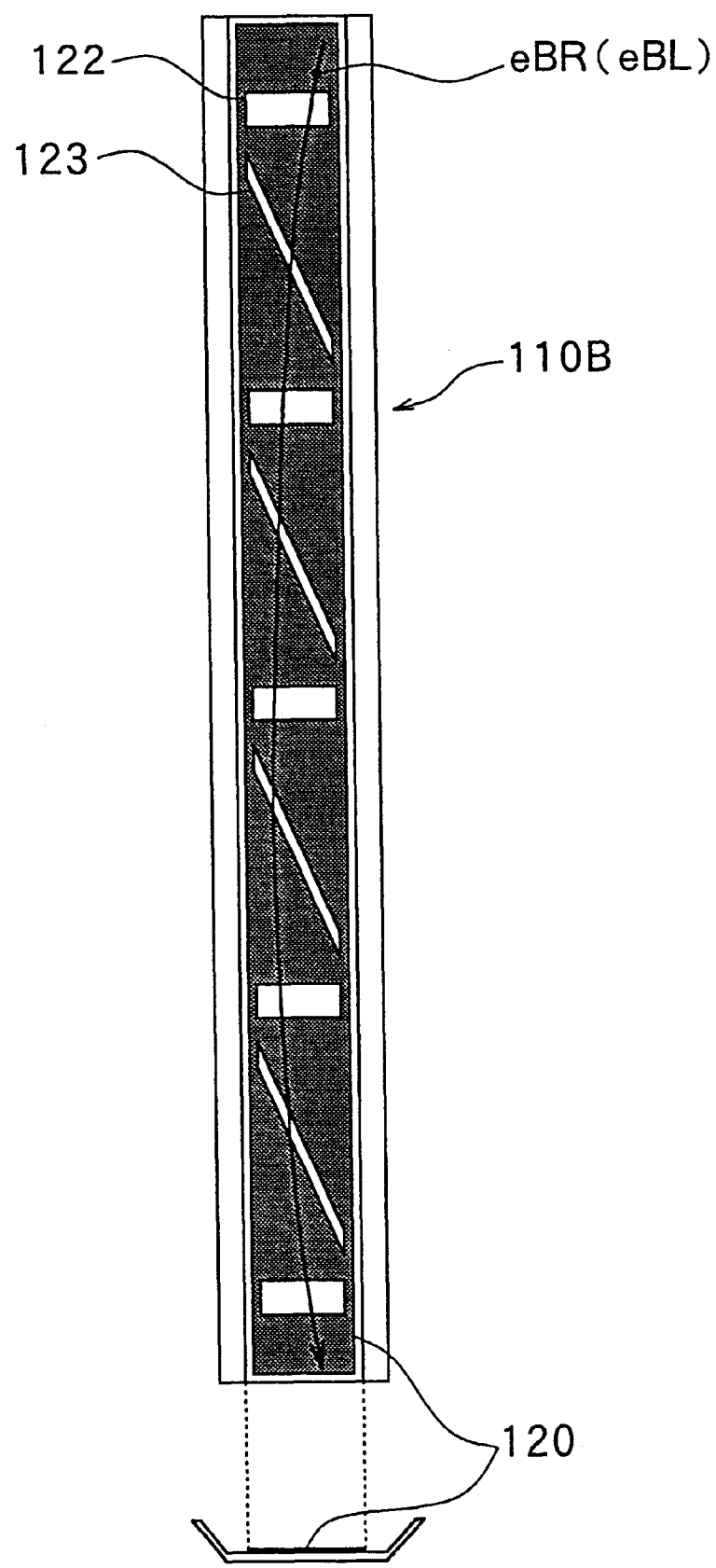
FIGS. 16A and 16B are figures showing another example of the index plate according to the third embodiment.

An index plate 110B shown in FIGS. 16A and 16B can be used, for example, in a case where the line scan of each electrode beam eBL and eBR is performed from the top to the bottom and the field scan is performed in a horizontal direction like the index electrode 70A shown in FIG. 13A.

The configuration of the index plate 110B is identical to the index plate 110A shown in FIG. 15 except that the shape of the pattern formed of the phosphor 120 is different. In the index plate 110B, patterns with identical shapes to each notch 131 and 132 provided in the index electrode 70A shown in FIG. 13A are formed of the phosphor 120 in each region 122 and 123 which corresponds to each notch 131 and 132. As described, the phosphor 120 forms predetermined patterns to be provided. Consequently, when each electron beam eBL and eBR passes through on the index plate 110B, the areas where the phosphor 120 is intermittently provided emit light. The pattern of emission can be corresponded to that of the electric detection signal detected in the index electrode 70A.

In the index plates 110A and 110B shown in FIGS. 15A and 15B and FIGS. 16A and 16B, the regions where the phosphor 120 is provided may be placed in the other way around from the state shown in the figures. For example, in the index plate 110A shown in FIGS. 15A and 15B, the phosphor 120 may be provided only in the plurality of reversed-triangle regions represented by the code 121.

As described, in the tube of the embodiment, the index plate 110 which emits light according to the incidence of the electron beams eBL and eBR is provided in the over-scan region OS of the electron beams eBL and eBR on the side of the joint of the neighboring left and right divided screens, and the light projected from the index plate 110 is detected by the light detector 111 and outputted as the index signal S2' via the amplifier AMP2. Therefore, like the first and second embodiments, control of each electron beam eBL and eBR based on the index signal S2' is realized so that the position and brilliance of the left and right divided screens can be inconspicuously joined and excellent image display can be performed. Also, in the embodiment, signals according to the incidence of the electron beams eBL and eBR are optically detected. Therefore, high frequency characteristic of the index signal S2' becomes more excellent compared to the method used in the first and second embodiments in which the detection signals induced electrically using the conductive electrode.

Other configuration, operations and effects of the embodiment are identical to those of the first and second embodiments.

The invention is not limited to the above-mentioned embodiments but various modifications may be possible. For example, although a cathode ray tube which is capable of color display is described in the above-mentioned embodiments, the invention may be applied to a cathode ray tube which performs monochrome display. In this case, the above-mentioned convergence circuit 107 (FIG. 4) or the like can be omitted from the configuration. Also, in the above-mentioned embodiment, a configuration comprising two electron guns in which a single screen formed by joining two scan screens is described. However, the invention may be applied to a configuration comprising three or more electron guns in which a single screen is formed by joining three or more scan screens. In addition, in the above-mentioned embodiments, the single screen is formed by partially overlapping the divided screens. However, the single screen may be formed simply by linearly joining the ends of the divided screens without providing an overlap region.

Furthermore, in the first embodiment, as shown in FIGS. 1A and 1B, an example in which the line scan of each electron beam eBL and eBR is performed from the center to the right or left side of the screen in the opposite direction from each other and the field scan is performed from the top to the bottom like a common cathode ray tube is described. However, the scan direction of each electron beam eBL and eBR is not limited to those described above but the line scan can be performed from outer side of the screen to the center of the screen as well. Also, in the second embodiment, as shown in FIG. 12, the field scan of each electron beam eBL and eBR is performed from the center to the right or left side of the screen in the opposite direction from each other. However, the field scan can also be performed, for example, from the right or left side to the center of the screen.

Obviously many modifications and variations of the present invention are possible in the light of the above teachings. It is therefore to be understood that within the scope of the appended claims the invention may be practiced otherwise than as specifically described.

What is claimed is:

1. A cathode ray tube for performing image display through scanning an effective screen and an over-scan region outside the effective screen by a plurality of electron beams and forming a single screen through joining a plurality of divided screens by partially overlapping each other, the plurality of divided screens being formed by scanning of the plurality of electron beams wherein the cathode ray tube comprises:

a plurality of electron guns for radiating the plurality of electron beams;

means for detecting electron beams for outputting an optical or electrical signal according to an incidence of the electron beams, which is provided in a position corresponding to the overlap region of the plurality of divided screens in the cathode ray tube; and control means for performing position control of the plurality of divided screens and modulation control of brilliance in the overlap region of the plurality of divided screens based on the optical or electrical signal outputted from the means for detecting electron beams so that the plurality of divided screens is appropriately joined and displayed.

2. A cathode ray tube according to claim 1, further comprising light detecting means for detecting light outputted from the means for detecting electron beams wherein:

the means for detecting electron beams includes a member on which phosphor which emits light according to the incidence of the electron beam is provided.

3. A cathode ray tube according to claim 1, further comprising a shielding member for preventing the electron beams from reaching a phosphor surface, the shielding member being disposed in a position corresponding to the overlap region between the means for detecting electron beams and the phosphor surface which is to be scanned by the electron beams.

4. A cathode ray tube according to claim 1, wherein the control means performs modulation control so that a derivative indicating brilliance change in both ends of the overlap region of the plurality of divided screens becomes zero.

5. A cathode ray tube comprising an outer vessel, which performs image display through scanning an effective screen and an over-scan region outside the effective screen by a plurality of electron beams and forming a single screen through joining a plurality of divided screens by partially overlapping each other, the plurality of divided screens being formed by scanning of the plurality of electron beams wherein the cathode ray tube comprises:

a plurality of electron guns for radiating the plurality of electron beams;

a capacitor formed by using a part of the outer vessel as a dielectric;

means for detecting electron beams; which is provided in a position corresponding to the overlap region of the plurality of divided screens in the cathode ray tube and is electrically connected to the capacitor, for outputting an electrical signal generated according to an incidence of the electron beams outside the outer vessel through the capacitor; and control means for performing image display control so that the plurality of divided screens is appropriately joined and displayed based on the electrical signal outputted from the means for detecting electron beams.

6. A cathode ray tube according to claim 5, wherein the means for detecting electron beams comprises an conductive electrode where notches are provided on a portion, and the notches provided in the electrode include a notch for detecting signals and a notch for decreasing capacitance in order to decrease stray capacitance generated in the cathode ray tube.

7. A cathode ray tube according to claim 6, wherein the notch for detecting signals takes a shape which changes to a direction orthogonal to the scan direction of electron beams.

8. A cathode ray tube for performing image display through scanning an effective screen and an over-scan region outside the effective screen by a plurality of electron beams, and forming a single screen through joining a plurality of divided screens by partially overlapping each other, the plurality of divided screens being formed by scanning the plurality of electron beams wherein the cathode ray tube comprises:

a plurality of electron guns for radiating the plurality of electron beams;

means for detecting electron beams for outputting an optical or electrical signal according to an incidence of the electron beams, which comprises a plate member for detecting scan position of the electron beams in a horizontal direction and vertical direction, the plate member being provided in a position corresponding to the overlap region of the plurality of divided screens in the cathode ray tube and having a plurality of phosphor patterns or notches in an orthogonal direction of the scan direction of the election beams; and control means for detecting the scan position of the electron beams in a horizontal direction and vertical direction by every position, in which the phosphor patterns or notches are provided, based on the optical or electrical signal outputted from the means for detecting electron beams and for performing image display control based on the detection result so that the plurality of divided screens is appropriately joined and displayed.

9. A cathode ray tube according to claim 8, wherein the phosphor patterns or the notches take a shape which changes to a direction orthogonal to the scan direction of electron beams.

10. An image correcting method for a cathode ray tube performing image display through scanning an effective screen and an over-scan region outside the effective screen by a plurality of electron beams and forming a single screen through joining a plurality of divided screens by partially overlapping each other, the plurality of divided screens being formed by scanning of the plurality of electron beams wherein the method includes steps of:

outputting an optical or electrical signal from means for detecting electron beams provided in a position corresponding to the overlap region of the plurality of divided screens according to an incidence of the electron beams in the cathode ray tube; and performing position control of the plurality of divided screens and modulation control of brilliance in the overlap region of the plurality of divided screens so that the plurality of divided screens is appropriately joined and displayed based on the optical or electrical signal outputted from the means for detecting electron beams.

11. An image correcting method for a cathode ray tube comprising an outer vessel, which performs image display through scanning an effective screen and an over-scan region outside the effective screen by a plurality of electron beams and forming a single screen through joining a plurality of divided screens by partially overlapping each other, the plurality of divided screens being formed by scanning of the plurality of electron beams wherein the method includes steps of:

electrically connecting means for detecting electron beams which is provided in a position corresponding to the overlap region of the plurality of divided screens to a capacitor formed by using a part of the outer vessel as a dielectric in the cathode ray tube and outputting an electrical signal generated according to an incidence of the electron beams outside the outer vessel through the capacitor; and performing image display control so that the plurality of divided screens is appropriately joined and displayed based on the electrical signal outputted from the means for detecting electron beams.

12. An image correcting method for a cathode ray tube performing image display through scanning an effective screen and an over-scan region outside the effective screen by a plurality of electron beams and forming a single screen through joining a plurality of divided screens by partially overlapping each other, the plurality of divided screens being formed by scanning of the plurality of electron beams wherein the method includes steps of:

outputting an optical or electrical signal according to an incidence of the electron beams from means for detecting electron beams, which comprises a plate member for detecting scan position of the electron beams in a horizontal direction and vertical direction, the plate member being provided in a position corresponding to the overlap region of the plurality of divided screens in the cathode ray tube and having a plurality of phosphor patterns or notches in an orthogonal direction of the scan direction of the electron beams; and performing image display control based on a detection result so that the plurality of divided screens is appropriately joined and displayed, the detection result being obtained by detecting the scan position of the electron beams in a horizontal direction and vertical direction by every position, in which the phosphor patterns or notches are provided, based on the optical or electrical signal outputted from the means for detecting electron beams.

* * * * *

UNITED STATES PATENT AND TRADEMARK OFFICE
CERTIFICATE OF CORRECTION

PATENT NO. : 6,304,034 B1
DATED : October 16, 2001
INVENTOR(S) : Hiromu Hosokawa It is certified that error appears in the above-identified patent and that said Letters Patent is hereby corrected as shown below:

Column 20,
Line 15, replace "comprises an conductive" with -- comprises a conductive --.
Line 22, replace "beams; which" with -- beams, which --.

Signed and Sealed this

Twenty-fifth Day of February, 2003

JAMES E. ROGAN
*Director of the United States Patent and Trademark Office*